United States Patent
Shimodaira et al.

(10) Patent No.: US 6,818,263 B2
(45) Date of Patent: Nov. 16, 2004

(54) RESIN SHEETS CONTAINING DISPERSED PARTICLES AND LIQUID CRYSTAL DISPLAYS

(75) Inventors: Kiichi Shimodaira, Osaka (JP); Toshiyuki Umehara, Osaka (JP); Nobuyoshi Yagi, Osaka (JP); Yoshimasa Sakata, Osaka (JP); Yoshihiro Kitamura, Osaka (JP); Katsuhiro Nakano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/867,543

(22) Filed: May 31, 2001

(65) Prior Publication Data

US 2002/0102367 A1 Aug. 1, 2002

(30) Foreign Application Priority Data

| May 31, 2000 | (JP) | P. 2000-163404 |
| Mar. 21, 2001 | (JP) | P. 2001-079836 |
| Mar. 21, 2001 | (JP) | P. 2001-080518 |
| Mar. 21, 2001 | (JP) | P. 2001-081029 |

(51) Int. Cl.[7] .......................... C09K 19/00; B32B 5/16; B32B 27/38
(52) U.S. Cl. .................. 428/1.6; 428/220; 428/323; 428/330; 428/331; 428/332; 428/413; 428/417; 428/418; 428/923; 428/926
(58) Field of Search .................. 428/1.6, 220, 323, 428/413, 417, 418, 923, 926, 327–332, 334, 337, 339, 411.1, 412, 416, 474.4, 480, 457–463, 500, 929

(56) References Cited

U.S. PATENT DOCUMENTS

| 5,051,298 | A | * | 9/1991 | Landry et al. ............... 428/220 |
| 5,552,907 | A | | 9/1996 | Yokota et al. |
| 5,607,764 | A | * | 3/1997 | Konno et al. ............... 428/327 |
| 5,716,698 | A | * | 2/1998 | Schreck et al. ............. 428/323 |
| 5,800,904 | A | * | 9/1998 | Hallman et al. ............ 428/156 |
| 5,932,342 | A | * | 8/1999 | Zeira et al. ................. 428/327 |
| 5,942,320 | A | * | 8/1999 | Miyake et al. .............. 428/216 |
| 5,963,284 | A | * | 10/1999 | Jones et al. ................. 349/112 |
| 5,990,994 | A | | 11/1999 | Stephenson |
| 6,432,516 | B1 | * | 8/2002 | Terasaki et al. ............ 428/195 |

FOREIGN PATENT DOCUMENTS

| JP | 6-238853 | 8/1994 | ......... B32B/27/38 |
| JP | 7-24400 | 1/1995 | ......... B05D/1/18 |
| JP | 10-255556 A | 9/1998 | |
| JP | 11-64611 | 3/1999 | ......... G02B/5/02 |

* cited by examiner

*Primary Examiner*—Sheeba Ahmed
(74) *Attorney, Agent, or Firm*—Sughrue Mion, PLLC

(57) ABSTRACT

A resin sheet which comprises a base layer containing particles dispersed therein and hence has excellent dimensional stability; a resin sheet which comprises a base layer containing particles dispersed therein and hence has excellent light diffusion properties; resin sheets which comprise either of those resin sheets containing dispersed particles and a reflecting layer, inorganic gas barrier layer, and color filter layer respectively superposed thereon; and a liquid crystal display using any of these resin sheets containing dispersed particles.

Some of the resin sheets containing dispersed particles comprise a base layer comprising a thermoplastic resin or thermoset resin and dispersed therein an inorganic oxide having an average particle diameter of 1 to 100 nm, the amount of the inorganic oxide being 0.1 to 23% by weight based on the weight of the base layer.

44 Claims, 2 Drawing Sheets

RESIN SHEETS CONTAINING DISPERSED PARTICLES AND LIQUID CRYSTAL DISPLAYS

FIELD OF THE INVENTION

The present invention relates to a resin sheet containing dispersed particles which comprises a base layer containing an inorganic oxide dispersed therein, is thin and lightweight, and is excellent in mechanical strength and dimensional stability. The invention further relates to a resin sheet containing dispersed particles which comprises a base layer containing a diffuser dispersed therein, is thin and lightweight, and is excellent in mechanical strength and light-diffusing properties. The invention furthermore relates to resin sheets which comprise either of those resin sheets containing dispersed particles and a reflecting layer, inorganic gas barrier layer, and color filter layer respectively superposed thereon. The invention still further relates to liquid crystal displays respectively employing those resin sheets containing dispersed particles.

BACKGROUND OF THE INVENTION

With the trend toward size increase in liquid crystal displays and electroluminescent displays, a resin sheet made of an epoxy resin or the like for use as a substrate has been proposed and developed for the purposes of thickness and weight reduction, etc., because glass substrates are heavy and bulky. However, since the resin sheet not only expands thermally but undergoes expansion and contraction due to the absorption and desorption of water vapor, it has posed a problem that positioning errors occur at the time of electrode formation or color filter formation. In particular, in forming a color filter, it is necessary to form R (red), G (green), and B (blue) patterns and a BM (black matrix) precisely in respective given positions. It has, however, been difficult with the resin sheet to increase the accuracy thereof. Known examples of methods for forming a color filter include: the dyeing process in which dyeable media formed by photolithography are dyed; the pigment dispersion process in which pigmented photosensitive compositions are used; the electrodeposition method in which a patterned electrode is used; the printing method, which is a low-cost process; and the ink-jet method in which colored areas are formed with ink-jet apparatus.

In the field of displays such as liquid crystal displays, a technique has been known which comprises applying a light diffusing sheet containing transparent particles to the viewing side of a liquid crystal cell to prevent the glitter attributable to illumination or the built-in backlight and thereby improve visibility. However, from the standpoint of reducing the thickness and weight of liquid crystal displays, investigations are being made on the impartation of a light diffusing function to a substrate for liquid crystal cells in place of the application of a light diffusion sheet to the viewing side of a liquid crystal cell.

Recently, the demand for small, portable communication terminal apparatus is increasing with the progress in satellite communication and in the technology of mobile communication. The displays mounted on many of such small, portable communication terminal apparatus are required to be thin, and the most frequently used of such displays are liquid crystal displays.

The displays for use in small, portable communication terminal apparatus are further required to be reduced in power consumption and be highly visible when externally illuminated. Because of this, reflection type liquid crystal displays are more frequently used than transmission type liquid crystal displays.

Use of the resin sheet made of an epoxy resin or the like as a substrate for liquid crystal cells has aroused other problems because the resin sheet has poor gas barrier properties. Specifically, one problem is that water vapor and oxygen permeate through the substrate of the liquid crystal cell and enter the cell to cause the transparent conductive film pattern to peel off the substrate. Another problem is that the water vapor and oxygen which have entered the cell accumulate to form bubbles and thereby arouse troubles such as appearance failures and alteration of the liquid crystal.

SUMMARY OF THE INVENTION

Accordingly, one object of the invention is to provide a resin sheet containing dispersed particles, which has excellent dimensional stability, and a resin sheet containing dispersed particles, which has excellent light diffusion properties, by using a base layer containing particles dispersed therein Another object of the invention is to provide resin sheets which comprise either of the resin sheets containing dispersed particles described above, a reflecting layer, inorganic gas barrier layer and color filter layer, respectively superposed thereon.

Still another object of the invention is to provide liquid crystal displays respectively using those resin sheets containing dispersed particles.

The invention provides a resin sheet containing dispersed particles which comprises a base layer comprising a thermoplastic resin or a thermosetting resin, and dispersed therein an inorganic oxide having an average particle diameter of 1 to 100 nm, the amount of the inorganic oxide being 0.1 to 23% by weight based on weight of the base layer.

The resin sheet containing dispersed particles of the invention preferably has a light transmittance of 88% or higher at λ=550 nm. The resin sheet containing dispersed particles of the invention preferably has a coefficient of linear expansion of 1.00E-4/° C. or lower as measured in the temperature range of 100° C. to 160° C. Furthermore, the dimensional change of the resin sheet containing dispersed particles of the invention as calculated from the size thereof measured immediately after 20 minutes heating at 150° C. and the size thereof measured immediately after 20 minutes heating at 150° C. and subsequent 2 hour standing at room temperature is preferably lower than +0.020%. An electrode-bearing resin sheet can be produced by forming an electrode on the resin sheet of the invention. A reflection type resin sheet can also be produced by forming a reflecting layer comprising a thin metal layer on the resin sheet containing dispersed particles of the invention. The reflection type resin sheet preferably has an oxygen permeability of 0.3 cc/m²·24 h·atm or lower.

The invention further provides a liquid crystal display which uses the resin sheet containing dispersed particles which comprises a base layer comprising a resin and an inorganic oxide dispersed therein.

The invention still further provides the resin sheet containing dispersed particles described above wherein the base layer containing an inorganic oxide dispersed therein contains a diffuser dispersed therein which has a refractive index different from that of the resin constituting the base layer and has an average particle diameter of 0.2 to 100 μm, the amount of the diffuser being 0.1 to 60% by weight based on the weight of the base layer. The difference in specific gravity between the diffuser and the resin constituting the base layer is preferably 1 or smaller, and the difference in refractive index between the diffuser and the resin constituting the base layer is preferably 0.03 to 0.10. A reflecting layer comprising a thin metal layer may be formed on the resin sheet containing dispersed particles. This resin sheet containing dispersed particles which has a reflecting layer preferably has an oxygen permeability of 0.3 cc/m$^2$·24 h·atm or lower. In the resin sheet containing dispersed particles described above wherein the base layer contains both an inorganic oxide and a diffuser and is an outermost layer, this outermost layer is preferably smooth. The invention can further provide a liquid crystal display which uses the resin sheet containing dispersed particles in which the base layer contains both an inorganic oxide and a diffuser.

The invention furthermore provides a resin sheet containing dispersed particles which comprises a base layer which is constituted of a thermoplastic resin or thermoset resin and contains, dispersed in the resin, a diffuser which has a refractive index different from that of the resin and has an average particle diameter of 0.2 to 100 μm, the amount of the diffuser being 200 parts by weight or smaller per 100 parts by weight of the resin constituting the base layer. The difference in specific gravity between the diffuser and the resin constituting the base layer is preferably 1 or smaller, and the difference in refractive index between the diffuser and the resin constituting the base layer is preferably 0.03 to 0.10. A reflection type resin sheet can be produced by forming a reflecting layer comprising a thin metal layer on the resin sheet containing dispersed particles wherein the base layer contains a diffuser. This reflection type resin sheet preferably has an oxygen permeability of 0.3 cc/m$^2$·24 h·atm or lower.

The invention furthermore provides a resin sheet containing dispersed particles which comprises a base layer comprising a thermoplastic resin or thermoset resin and dispersed therein an inorganic oxide having an average particle diameter of 1 to 100 nm and an inorganic gas barrier layer, the amount of the inorganic oxide being 0.1 to 23% by weight based on the weight of the base layer. This resin sheet containing dispersed particles of the invention, which comprises a base layer comprising a resin and an inorganic oxide dispersed therein and an inorganic gas barrier layer, preferably has a light transmittance of 85% or higher at λ=550 nm. This resin sheet containing dispersed particles preferably has a coefficient of linear expansion of 1.00E-4/° C. or lower as measured in the temperature range of 100° C. to 160° C. The dimensional change of the resin sheet as calculated from the size thereof measured immediately after 20 minutes heating at 150° C. and the size thereof measured immediately after 20 minutes heating at 150° C. and subsequent 2 hours standing at room temperature is preferably lower than +0.015%. In this resin sheet, the inorganic gas barrier layer is preferably made of a silicon oxide and the ratio of the number of oxygen atoms to that of silicon atoms is preferably 1.5 to 2.0. Alternatively, the inorganic gas barrier layer is preferably made of a silicon nitride and the ratio of the number of nitrogen atoms to that of silicon atoms is preferably 1.0 to 4/3. The inorganic gas barrier layer preferably has a thickness of 5 to 200 nm. This resin sheet containing dispersed particles of the invention, which comprises a base layer comprising a resin and an inorganic oxide dispersed therein and an inorganic gas barrier layer, preferably has a water vapor permeability of 10 g/m$^2$·24 h·atm or lower.

The invention furthermore provides the resin sheet containing dispersed particles described above wherein the base layer containing an inorganic oxide dispersed therein contains a diffuser dispersed therein which has a refractive index different from that of the resin constituting the base layer and has an average particle diameter of 0.2 to 100 μm, the amount of the diffuser being 0.1 to 60% by weight based on the weight of the base layer. The difference in specific gravity between the diffuser and the resin constituting the base layer is preferably 1 or smaller, and the difference in refractive index between the diffuser and the resin constituting the base layer is preferably 0.03 to 0.10. In the resin sheet containing dispersed particles described above wherein the base layer contains both an inorganic oxide and a diffuser and is an outermost layer, this outermost layer is preferably smooth. The invention can further provide a liquid crystal display which uses the resin sheet containing dispersed particles in which the base layer contains both an inorganic oxide and a diffuser.

The invention furthermore provides a resin sheet containing dispersed particles which comprises: a base layer which is constituted of a thermoplastic resin or thermoset resin and contains, dispersed in the resin, a diffuser which has a refractive index different from that of the resin and has an average particle diameter of 0.2 to 100 μm; and an inorganic gas barrier layer, the amount of the diffuser being 200 parts by weight or smaller per 100 parts by weight of the resin constituting the base layer. The difference in specific gravity between the diffuser and the resin constituting the base layer is preferably 1 or smaller, and the difference in refractive index between the diffuser and the resin constituting the base layer is preferably 0.03 to 0.10. This resin sheet containing dispersed particles preferably has a water vapor permeability of 10 g/m$^2$·24 h·atm or lower.

The invention furthermore provides a resin sheet containing dispersed particles which comprises a base layer comprising a thermoplastic resin or thermo set resin and dispersed therein an inorganic oxide having an average particle diameter of 1 to 100 nm and a color filter layer, the amount of the inorganic oxide being 0.1 to 23% by weight based on the weight of the base layer. This resin sheet containing dispersed particles of the invention, which comprises a base layer comprising a resin and an inorganic oxide dispersed therein and a color filter layer, preferably has a coefficient of linear expansion of 1.00E-4/° C. or lower as measured in the temperature range of 100° C. to 160° C. The dimensional change of the resin sheet as calculated from the size thereof measured immediately after 20 minutes heating at 150° C. and the size thereof measured immediately after 20 minutes heating at 150° C. and subsequent 2 hours standing at room temperature is preferably lower than +0.020%.

The invention furthermore provides the resin sheet containing dispersed particles described above wherein the base layer containing an inorganic oxide dispersed therein contains a diffuser dispersed therein which has a refractive index different from that of the resin constituting the base layer and has an average particle diameter of 0.2 to 100 μm, the amount of the diffuser being 0.1 to 60% by weight based on the weight of the base layer. The difference in specific gravity between the diffuser and the resin constituting the base layer is preferably 1 or smaller, and the difference in refractive index between the diffuser and the resin constituting the base layer is preferably 0.03 to 0.10. In the resin sheet containing dispersed particles described above wherein the base layer contains both an inorganic oxide and a diffuser and is an outermost layer, this outermost layer is preferably smooth. The invention can further provide a liquid crystal display which employs the resin sheet containing dispersed particles in which the base layer contains both an inorganic oxide and a diffuser.

The invention furthermore provides a resin sheet containing dispersed particles which comprises: a base layer which is constituted of a thermoplastic resin or thermoset resin and contains, dispersed in the resin, a diffuser which has a refractive index different from that of the resin and has an average particle diameter of 0.2 to 100 μm; and a color filter layer, the amount of the diffuser being 200 parts by weight or smaller per 100 parts by weight of the resin constituting the base layer. The difference in specific gravity between the diffuser and the resin constituting the base layer is preferably 1 or smaller, and the difference in refractive index between the diffuser and the resin constituting the base layer is preferably 0.03 to 0.10.

DESCRIPTION OF THE REFERENCE NUMERALS

Figure 1:
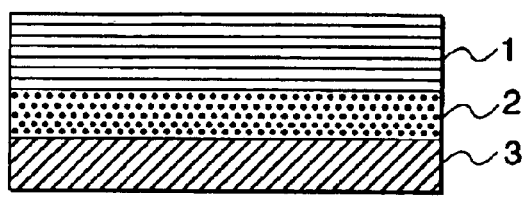
FIG. 1 is a sectional view of one resin sheet containing dispersed particles.

1: Base layer containing inorganic oxide dispersed therein
2: Organic gas barrier layer
3: Urethane-acrylate layer
4: Base layer containing diffuser and inorganic oxide dispersed therein
5: Base layer containing diffuser dispersed therein
6: Reflecting layer
7: Inorganic gas barrier layer
8: Color filter layer

DETAILED DESCRIPTION OF THE INVENTION

Containing dispersed particles in the invention involves: the case in which the base layer contains an inorganic oxide; the case in which the base layer contains both an inorganic oxide and a diffuser; and the case in which the base layer contains a diffuser One of the resin sheets containing dispersed particles of the invention comprises a base layer comprising a thermoplastic resin or thermoset resin and dispersed therein an inorganic oxide having an average particle diameter of 1 to 100 nm, wherein the amount of the inorganic oxide is 0.1 to 23% by weight based on the weight of the base layer. An example of a resin sheet containing dispersed particles which comprises the resin sheet containing dispersed particles described above and, superposed thereon, a urethane-acrylate layer and an organic gas barrier layer is shown in FIG. 1.

Examples of the thermoplastic resin include polycarbonates, polyarylates, polyethersulfones, polysulfones, polyesters, poly(methyl methacrylate), polyetherimides and polyamides. Examples of the thermosetting resin include those formed from thermosetting resins such as epoxy resins, unsaturated polyesters, poly(diallyl phthalate), and poly (isobornyl methacrylate). These resins can be used alone or in combination of two or more thereof, and may be used as a copolymer or mixture with other ingredients.

It is preferred to use thermosetting resins in order to obtain surface smoothness. Epoxy resins are especially preferred of the thermosetting resins from the standpoint of hue. Examples of the epoxy resins include the bisphenol types such as bisphenol A, bisphenol F, and bisphenol S types and hydrogenated epoxy resins derived from these, the novolac types such as phenol-novolac and cresol-novolac types, the nitrogen-containing cyclic types such as triglycidyl isocyanurate and hydantoin types, the alicyclic type, the aliphatic type, the aromatic types such as naphthalene type, the glycidyl ether type, the low water absorption types such as biphenyl type, the dicyclo type, the ester type, the etherester type, and modifications of those. Those resins may be used alone or in combination of two or more thereof Preferred of those various epoxy resins from the standpoints of discoloration prevention etc. are bisphenol A epoxy resins, alicyclic epoxy resins, and triglycidyl isocyanurate type epoxy resins.

From the standpoint of obtaining a resin sheet satisfactory in flexibility, strength, and other properties, it is generally preferred to use such an epoxy resin having an epoxy equivalent of 100 to 1,000 and a softening point of 120° C. or lower. From the standpoint of obtaining an epoxy resin-containing liquid excellent in applicability, spreadability into sheet, etc., it is preferred to use a two-pack type resin which is liquid at temperatures not higher than the application temperature, in particular at room temperature.

A hardener and a hardening accelerator can be suitably incorporated into the epoxy resin. Furthermore, if required and necessary, various conventional additives such as antioxidants, modifiers, surfactants, dyes, pigments, discoloration inhibitors and ultraviolet absorbers can be suitably incorporated.

The hardener is not particularly limited, and one or more suitable hardeners can be used according to the epoxy resin used. Examples thereof include organic acid compounds such as tetrahydrophthalic acid, methyltetrahydrophthalic acid, hexahydrophthalic acid, and methylhexahydrophthalic acid and amine compounds such as ethylenediamine, propylenediamine, diethylenetriamine, triethylenetetramine, amine adducts of these, m-phenylenediamine, diaminodiphenylmethane and diaminodiphenyl sulfone.

Other examples of the hardener include amide compounds such as dicyandiamide and polyamides, hydrazide compounds such as dihydrazide, and imidazole compounds such as methylimidazole, 2-ethyl-4-methylimidazole, ethylimidazole, isopropylimidazole, 2,4-dimethylimidazole, phenylimidazole, undecylimidazole, heptadecylimidazole and 2-phenyl-4-methylimidazole.

Examples of the hardener further include imidazoline compounds such as methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline, and further include phenol compounds, urea compounds, and polysulfide compounds.

Acid anhydride compounds also are included in examples of the hardener. Such acid anhydride hardeners can be advantageously used from the standpoints of discoloration prevention, etc. Examples thereof include phthalic anhydride, maleic anhydride, trimellitic anhydride, pyromellitic anhydride, nadic anhydride, glutaric anhydride, tetrahydrophthalic anhydride, methyltetrahydrophthalic anhydride, hexahydrophthalic anhydride, methylhexahydrophthalic anhydride, methylnadic anhydride, dodecenylsuccinic anhydride, dichlorosuccinic anhydride, benzophenonetetracarboxylic anhydride, and chlorendic anhydride.

Especially preferred are acid anhydride hardeners which are colorless to pale yellow and have a molecular weight of about 140 to 200, such as phthalic anhydride, tetrahydrophthalic anhydride, hexahydrophthalic anhydride, and methylhexahydrophthalic anhydride.

In the case where an acid anhydride is used as a hardener, the epoxy resin and this hardener are mixed in such a proportion that the amount of the acid anhydride is preferably 0.5 to 1.5 equivalents, more preferably 0.7 to 1.2 equivalents, per equivalent of the epoxy groups of the epoxy resin. If the acid anhydride is used in an amount smaller than 0.5 equivalent, the cured resin tends to have an impaired hue. If the acid anhydride is used in an amount exceeding 1.5 equivalents, the cured resin tends to have reduced moisture resistance. In the case of using one or more other hardeners, the range of the amount thereof to be used may be the same as in the case described above.

Examples of the hardening accelerator include tertiary amines, imidazole compounds, quaternary ammonium salts, organic metal salts, phosphorus compounds, and urea compounds. Especially preferred of these are tertiary amines and imidazole compounds. These compounds can be used alone or in combination of two or more thereof.

The amount of the hardening accelerator to be incorporated is preferably 0.05 to 7.0 parts by weight, more preferably 0.2 to 3.0 parts by weight, per 100 parts by weight of the epoxy resin. If the amount of the hardening accelerator incorporated is smaller than 0.05 part by weight, a sufficient hardening-accelerating effect cannot be obtained. If the amount thereof exceeds 7.0 parts by weight, there is a possibility that the cured resin might discolor.

Examples of the antioxidant include conventional antioxidants such as phenol compounds, amine compounds, organosulfur compounds, and phosphine compounds.

Examples of the modifier include conventional modifiers such as glycols, silicones, and alcohols.

The surfactant is added for the purpose of obtaining an epoxy resin sheet having a smooth surface when the epoxy resin is formed into a sheet by flow casting or another technique and cured while in contact with air. Examples of the surfactant include silicone, acrylic, and fluorochemical surfactants. Especially preferred are silicone surfactants.

Examples of the inorganic oxide in the invention include silica, titanium dioxide, antimony oxide, titania, alumina, zirconia, and tungsten oxide. Such inorganic oxides may be used alone or as a mixture of two or more thereof. The inorganic oxide should have a particle diameter of 1 to 100 nm. Inorganic oxides having a particle diameter smaller than 1 nm have poor dispersibility, while use of an inorganic oxide having a particle diameter exceeding 100 nm may result in a resin sheet containing dispersed particles which has impaired optical properties.

The amount of the inorganic oxide incorporated in the invention should be 0.1 to 23% by weight, preferably 2 to 20% by weight, more preferably 5 to 15% by weight, based on the weight of the base layer. If the amount of the inorganic oxide incorporated is smaller than 0.1% by weight based on the weight of the base layer, the resulting resin sheet containing dispersed particles shows an increased dimensional change, making it difficult to conduct patterning in color filter layer formation thereon or to form an electrode thereon. If the amount thereof exceeds 23%, the resulting resin sheet containing dispersed particles has an impaired light transmittance.

The light transmittance of the resin sheet containing dispersed particles of the invention is preferably 88% or higher, more preferably 90% or higher. If the light transmittance thereof is lower than 88%, a liquid crystal display fabricated with this resin sheet containing dispersed particles has impaired display quality with reduced picture brightness. The light transmittance of the resin sheet is determined with a high speed spectrophotometer at $\lambda=550$ nm.

The coefficient of linear expansion of the resin sheet containing dispersed particles of the invention as measured in the temperature range of 100° C. to 160° C. is preferablyl 1.00E-4/° C. or lower, more preferably 8.00E-5/° C. or lower.

If the coefficient of linear expansion of the resin sheet containing dispersed particles exceeds 1.00E-4/° C., not only positioning errors in patterning are apt to occur when a color filter is formed thereon, but also it is difficult to form an electrode on the resin sheet.

The coefficient of linear expansion of the resin sheet can be determined by examining the resin sheet by the method for TMA described in JIS K-7197 and calculating the coefficient using equation (1). In equation (1), $\Delta Is(T_1)$ and $\Delta Is(T_2)$ are found TMA values ($\mu$m) obtained respectively at measuring temperatures of $T_1$ and $T_2$ (° C.), and $L_0$ is the length (mm) of the sample at room temperature.

$$\text{Coefficient of linear expansion } (/°C.) = \frac{1}{L_0 \times 10^3} \cdot \frac{\Delta Is(T_2) - \Delta Is(T_1)}{T_2 - T_1} \quad \text{Equation (1)}$$

The dimensional change of the resin sheet containing dispersed particles of the invention as calculated from the size thereof measured immediately after 20 minutes heating at 150° C. and the size thereof measured immediately after 20 minutes heating at 150° C. and subsequent 2 hours standing at room temperature is preferably lower than +0.020%, more preferably +0.010% or lower. The dimensional change of the resin sheet can be calculated as (B−A)/A×100, wherein A is the size of the resin sheet measured immediately after 20 minutes heating at 150° C. and B is the size of the resin sheet measured after 20 minutes heating at 150° C. and subsequent 2 hours standing at room temperature. If the dimensional change of the resin sheet containing dispersed particles is +0.020% or higher, not only positioning errors in patterning are apt to occur when a color filter is formed thereon, but also it is difficult to form an electrode on the resin sheet.

By forming an electrode on the resin sheet containing dispersed particles of the invention, an electrode-bearing resin sheet containing dispersed particles can be provided.

The electrode is preferably a transparent electrode film. A transparent electrode film can be formed from an appropriate material such as indium oxide, tin oxide, an indium-tin mixed oxide, gold, platinum, palladium or a transparent conductive coating material by a conventional method such as a film deposition technique, e.g., vapor deposition or sputtering, or coating. A transparent conductive film of a given electrode pattern can be directly formed. An oriented film for liquid crystal alignment can also be formed on the transparent conductive film by a conventional method according to need.

A reflecting layer may be formed on the resin sheet containing dispersed particles of the invention in which the base layer contains an inorganic oxide, thereby giving a reflection type resin sheet containing dispersed particles. The reflecting layer is preferably a thin metal layer made of, e.g., silver or aluminum. This reflecting layer has a gas barrier function and prevents water vapor and oxygen from coming into the resin sheet. Consequently, in this invention, there is no need of superposing an organic gas barrier layer made of poly(vinyl alcohol) or the like or an inorganic gas barrier layer made of silicon oxide or the like.

The thickness of the reflecting layer is preferably 50 to 1,000 nm, more preferably 100 to 500 nm. Thicknesses of the reflecting layer smaller than 50 nm result in reduced reliability with respect to heat resistance, moisture resistance, etc. Thicknesses thereof exceeding 1,000 nm are apt to result in cracking and lead to an increased cost. Furthermore, formation of such a too thick reflecting layer makes the resin sheet unusable in a transmission type liquid crystal display.

The oxygen permeability of the reflection type resin sheet containing dispersed particles of the invention is preferably 0.3 cc/m$^2$·24 h·atm or lower, more preferably 0.15 cc/m$^2$·24 h·atm or lower. If the oxygen permeability thereof exceeds 0.3 cc/m$^2$·24 h·atm, use of this resin sheet containing dispersed particles in forming a liquid crystal cell poses problems, for example, that water vapor and oxygen penetrate into the cell to break the transparent conductive film pattern and that the water vapor and oxygen which have entered the cell accumulate to form bubbles and thereby arouse troubles such as appearance failures and alteration of the liquid crystal.

The reflection type resin sheet containing dispersed particles of the invention preferably has a yellowness index change, as calculated from the yellowness index thereof determined after 30 minutes heating at 200° C. and the yellowness index thereof determined at room temperature, of 0.75 or lower. The yellowness index change of the resin sheet can be calculated using the following equation (2), wherein YI is the yellowness index of the sheet determined at room temperature and YI$_{200}$ is the yellowness index of the sheet determined after 30 minutes heating at 200° C. If the yellowness index change of the reflection type resin sheet exceeds 0.75, use of this resin sheet in fabricating a liquid crystal display may result in cases where display quality is impaired, for example, because a white picture assumes a yellowish tint.

$$\Delta YI = \frac{(YI_{200} - YI)}{YI} \quad \text{Equation (2)}$$

A liquid crystal display is generally fabricate, for example, by suitably assembling components including a polarizing film, a liquid crystal cell, a reflector or backlight, and optional optical parts and integrating an operating circuit into the assembly. In the invention, a liquid crystal display can be fabricated according to such a conventional procedure without particular limitations, except that the resin sheet containing dispersed particles is used which comprises a base layer comprising a resin and an inorganic oxide dispersed therein. Consequently, appropriate optical parts can be suitably used in combination with the resin sheet containing dispersed particles in fabricating the liquid crystal display of the invention. For example, a light diffuser plate, antiglare layer, antireflection film, protective layer, or protective plate may be disposed over a viewing-side polarizing film. Furthermore, a retardation film for compensation may be interposed between the liquid crystal cell and the viewing-side polarizing film.

Figure 2:
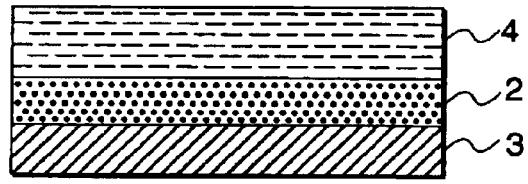
FIG. 2 is a sectional view of another resin sheet containing dispersed particles.
Figure 4:
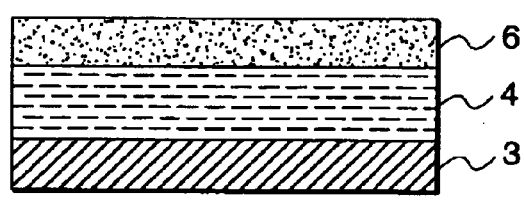
FIG. 4 is a sectional view of a further resin sheet containing dispersed particles.

In the resin sheet containing dispersed particles of the invention, the base layer may contain a diffuser dispersed therein which has a refractive index different from that of the resin constituting the base layer and an average particle diameter of 0.2 to 100 μm, in an amount of 0.1 to 60% by weight based on the weight of the base layer. Namely, the base layer in the invention may contain, dispersed therein, both an inorganic oxide and a diffuser. The amounts of the inorganic oxide and the diffuser incorporated are preferably 0.1 to 23% by weight and 0.1 to 60% by weight, respectively, based on the weight of the base layer. An example of a multilayer structure comprising the resin sheet containing dispersed particles described above and, superposed thereon, a urethane-acrylate layer and an organic gas barrier layer is shown in FIG. 2. Furthermore, an example of a multilayer structure comprising the resin sheet containing dispersed particles described above and, superposed thereon, a urethane-acrylate layer and a reflecting layer is shown in FIG. 4. The term "base layer containing a diffuser dispersed therein" means that the diffuser is present throughout the whole base layer without being present in a higher concentration in part of the base layer. The inorganic oxide serves to inhibit the base layer from dimensionally changing, while the diffuser imparts a light diffusion function to the base layer. By the impartation of a light diffusion function, the resin sheet containing dispersed particles, when used in a liquid crystal display, can prevent the glitter attributable to illumination or the built-in backlight to thereby improve visibility.

Examples of the diffuser include conductive inorganic particles made of a silicon compound, alumina, titania, zirconia, tin oxide, indium oxide, cadmium oxide, antimony oxide, or the like, organic particles made of an acrylic resin, melamine resin, or the like, and particles formed by coating the inorganic particles with the organic particles.

The diffuser has an average particle diameter of generally 0.2 to 100 μm, preferably 0.5 to 50 μm, more preferably 1 to 20 μm, from the standpoint of obtaining sufficient light diffusion properties, although such particle diameters may result in a decrease in an optical property.

The difference in specific gravity between the diffuser and the resin constituting the base layer is preferably 1 or smaller. If the difference in specific gravity therebetween is larger than 1, it is difficult to form a base layer in which the diffuser has been evenly incorporated.

The difference in refractive index between the diffuser and the resin constituting the base layer is preferably 0.03 to 0.10. If the difference in refractive index therebetween is smaller than 0.03 or larger than 0.10, a sufficient light diffusion function cannot be imparted.

A reflecting layer comprising a thin metal layer may be formed on the resin sheet containing dispersed particles of the invention in which the base layer contains both an inorganic oxide and a diffuser, thereby giving a reflection type resin sheet containing dispersed particles. The reflecting layer is preferably a thin metal layer made of, e.g., silver or aluminum. This reflecting layer has a gas barrier function and prevents water vapor and oxygen from coming into the resin sheet. Consequently, in this invention, there is no need of superposing an organic gas barrier layer made of poly (vinyl alcohol) or the like or an inorganic gas barrier layer made of silicon oxide or the like.

The thickness of the reflecting layer is preferably 50 to 1,000 nm, more preferably 100 to 500 nm. Thicknesses of the reflecting layer smaller than 50 nm result in reduced reliability with respect to heat resistance, moisture resistance, etc. Thicknesses thereof exceeding 1,000 nm are apt to result in cracking and lead to an increased cost. Furthermore, formation of such a too thick reflecting layer makes the resin sheet unusable in a transmission type liquid crystal display.

The oxygen permeability of the reflection type resin sheet containing dispersed particles of the invention is preferably 0.3 cc/m²·24 h·atm or lower, more preferably 0.15 cc/m²·24 h·atm or lower. If the oxygen permeability thereof exceeds 0.3 cc/m²·24 h·atm, use of this resin sheet containing dispersed particles in forming a liquid crystal cell poses problems, for example, that water vapor and oxygen penetrate into the cell to break the transparent conductive film pattern and that the water vapor and oxygen which have entered the cell accumulate to form bubbles and thereby arouse troubles such as appearance failures and alteration of the liquid crystal.

In the resin sheet containing dispersed particles described above in which the base layer contains both an inorganic oxide and a diffuser and is an outermost layer, the outer surface of the base layer is preferably smooth. The term "smooth" herein means that the surface roughness (Ra) of the layer determined in accordance with JIS B 0601-1994 is 1 nm or lower. Such a smooth surface of the base layer facilitates formation of an alignment film, transparent electrode, and other layers thereon.

A liquid crystal display is generally fabricate, for example, by suitably assembling components including a polarizing film, a liquid crystal cell, a reflector or backlight, and optional optical parts and integrating an operating circuit into the assembly. In the invention, a liquid crystal display can be fabricated according to such a conventional procedure without particular limitations, except that the resin sheet containing dispersed particles described above is used in which the base layer contains both an inorganic oxide and a diffuser. Consequently, appropriate optical parts can be suitably used in combination with the resin sheet containing dispersed particles in fabricating the liquid crystal display of the invention. For example, a light diffuser plate, antiglare layer, antireflection film, protective layer, or protective plate may be disposed over a viewing-side polarizing film. Furthermore, a retardation film for compensation may be interposed between the liquid crystal cell and the viewing-side polarizing film.

Figure 3:
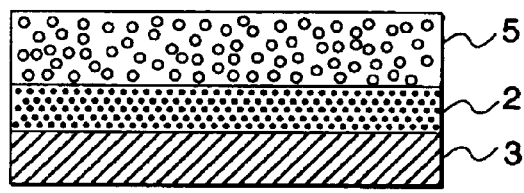
FIG. 3 is a sectional view of still another resin sheet containing dispersed particles.

The invention can further provides a resin sheet containing dispersed particles which comprises a base layer which is constituted of a thermoplastic resin or thermoset resin and contains, dispersed in the resin, a diffuser which has a refractive index different from that of the resin and has an average particle diameter of 0.2 to 100 μm, wherein the amount of the diffuser is 200 parts by weight or smaller per 100 parts by weight of the resin constituting the base layer. An example of a resin sheet containing dispersed particles which comprises the resin sheet containing dispersed particles described above and, superposed thereon, a urethane-acrylate layer and an organic gas barrier layer is shown in FIG. 3. Namely, in the invention, the base layer may contain, as the only particulate ingredient, a diffuser having a refractive index different from that of the resin constituting the base layer.

The amount of the diffuser to be used can be suitably determined according to the desired degree of light diffusion, etc. However, the amount of the diffuser to be incorporated is generally 200 parts by weight or smaller, preferably 1 to 150 parts by weight, more preferably 2 to 100 parts by weight, per 100 parts by weight of the resin constituting the base layer, when the diffuser is transparent particles.

The diffuser has an average particle diameter of generally 0.2 to 100 μm, preferably 0.5 to 50 μm, more preferably 1 to 20 μm, from the standpoint of obtaining sufficient light diffusion properties, although such particle diameters may result in a decrease in an optical property.

The difference in specific gravity between the diffuser and the resin constituting the base layer is preferably 1 or smaller. If the difference in specific gravity therebetween is larger than 1, it is difficult to form a base layer in which the diffuser has been evenly incorporated.

The difference in refractive index between the diffuser and the resin constituting the base layer is preferably 0.03 to 0.10 If the difference in refractive index therebetween is smaller than 0.03 or larger than 0.10, a sufficient light diffusion function cannot be imparted.

In the invention, a reflecting layer comprising a thin metal layer may be formed on the resin sheet containing dispersed particles in which the base layer contains a diffuser as the only particulate ingredient. The reflecting layer is preferably a thin metal layer made of, e.g., silver or aluminum. This reflecting layer has a gas barrier function and prevents water vapor and oxygen from penetrating through the resin sheet. Consequently, in this invention, there is no need of superposing an organic gas barrier layer made of poly(vinyl alcohol) or the like or an inorganic gas barrier layer made of silicon oxide or the like.

The thickness of the reflecting layer is preferably 50 to 1,000 nm, more preferably 100 to 500 nm Thicknesses of the reflecting layer smaller than 50 nm result in reduced reliability with respect to heat resistance, moisture resistance, etc. Thicknesses thereof exceeding 1,000 nm are apt to result in cracking and lead to an increased cost. Furthermore, formation of such a too thick reflecting layer makes the resin sheet unusable in a transmission type liquid crystal display.

The oxygen permeability of the reflection type resin sheet containing dispersed particles of the invention is preferably 0.3 cc/m²·24 h·atm or lower, more preferably 0.15 cc/m²·24 h·atm or lower. If the oxygen permeability thereof exceeds 0.3 cc/m²·24 h·atm, use of this resin sheet containing dispersed particles in forming a liquid crystal cell poses problems, for example, that water vapor and oxygen penetrate into the cell to break the transparent conductive film pattern and that the water vapor and oxygen which have entered the cell accumulate to form bubbles and thereby arouse troubles such as appearance failures and alteration of the liquid crystal.

The reflection type resin sheet containing dispersed particles described above preferably has a yellowness index change, as calculated from the yellowness index thereof determined after 30 minutes heating at 200° C. and the yellowness index thereof determined at room temperature, of 0.75 or lower. If the yellowness index change of the reflection type resin sheet exceeds 0.75, use of this resin sheet in fabricating a liquid crystal display may result in cases where display quality is impaired, for example, because awhite picture assumes a yellowish tint.

Figure 5:
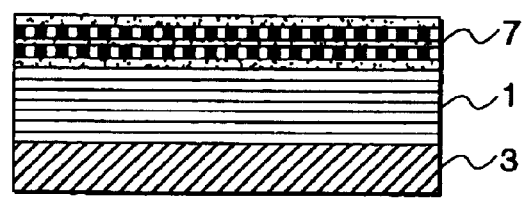
FIG. 5 is a sectional view of still a further resin sheet containing dispersed particles.

The resin sheet containing dispersed particles according to another embodiment of the invention comprises a base layer comprising a thermoplastic resin or thermoset resin and dispersed therein an inorganic oxide having an average particle diameter of 1 to 100 nm and an inorganic gas barrier layer, wherein the amount of the inorganic oxide is 0.1 to 23% by weight based on the weight of the base layer. An example of a resin sheet containing dispersed particles which comprises the resin sheet containing dispersed particles described above and a urethane-acrylate layer superposed thereon is shown in FIG. 5.

In the resin sheet containing dispersed particles of the invention which comprises a base layer comprising a resin and an inorganic oxide dispersed therein and an inorganic gas barrier layer, examples of the inorganic oxide include silica, titanium dioxide, antimony oxide, titania, alumina, zirconia, and tungsten oxide. Such inorganic oxides may be used alone or as a mixture of two or more thereof. The inorganic oxide should have a particle diameter of 1 to 100 nm. Inorganic oxides having a particle diameter smaller than 1 nm have poor dispersibility, while use of an inorganic oxide having a particle diameter exceeding 100 nm may result in a resin sheet containing dispersed particles which has impaired optical properties.

In the resin sheet containing dispersed particles of the invention which comprises a base layer comprising a resin and an inorganic oxide dispersed therein and an inorganic gas barrier layer, the amount of the inorganic oxide incorporated should be 0.1 to 23% by weight, preferably 2 to 20% by weight, more preferably 5 to 15% by weight, based on the weight of the base layer. If the amount of the inorganic oxide incorporated is smaller than 0.1% by weight based on the base layer, the resultant resin sheet containing dispersed particles shows an increased dimensional change, making it difficult to conduct patterning in color filter layer formation thereon or to form an electrode thereon. If the amount thereof exceeds 23%, the resultant resin sheet containing dispersed particles has an impaired light transmittance.

In the resin sheet containing dispersed particles of the invention which comprises a base layer comprising a resin and an inorganic oxide dispersed therein and an inorganic gas barrier layer, examples of materials usable for forming the inorganic gas barrier layer include known transparent gas barrier materials such as silicon oxides, magnesium oxide, aluminum oxide, and zinc oxide. However, silicon oxides are preferred from the standpoints of gas barrier properties, adhesion to the base layer, etc.

A silicon oxide in which the ratio of the number of oxygen atoms to that of silicon atoms is 1.5 to 2.0 is preferred from the standpoints of the gas barrier properties, transparency, surface smoothness, flexibility, film stress, and cost of the inorganic gas barrier layer, etc. If the ratio of the number of oxygen atoms to that of silicon atoms is lower than 1.5, the results are impaired flexibility and impaired transparency. In the silicon oxides, the maximum value of the ratio of the number of oxygen atoms to that of silicon atoms is 2.0.

Silicon nitrides also can be advantageously used as materials for forming the inorganic gas barrier layer. A silicon nitride in which the ratio of the number of nitrogen atoms to that of silicon atoms is 1.0 to 4/3 is preferred from the standpoints of the gas barrier properties, transparency, surface smoothness, flexibility, film stress, and cost of the inorganic gas barrier layer, etc. In the silicon nitrides, the maximum value of the ratio of the number of nitrogen atoms to that of silicon atoms is 4/3.

The inorganic gas barrier layer in the invention preferably has a thickness of 5 to 200 nm. If the thickness of the inorganic gas barrier layer is smaller than 5 nm, satisfactory gas barrier properties cannot be obtained. If the thickness of the inorganic gas barrier layer exceeds 200 nm, this gas barrier layer has problems concerning transparency, flexibility, film stress, and cost.

The light transmittance of the resin sheet containing dispersed particles of the invention which comprises a base layer comprising a resin and an inorganic oxide dispersed therein and an inorganic gas barrier layer is preferably 85% or higher, more preferably 88% or higher. If the light transmittance thereof is lower than 85%, a liquid crystal display fabricated with this resin sheet containing dispersed particles has impaired display quality with reduced picture brightness. The light transmittance of the resin sheet is determined with a high speed spectrophotometer at $\lambda=550$ nm.

The coefficient of linear expansion of the resin sheet containing dispersed particles of the invention which comprises a base layer comprising a resin and an inorganic oxide dispersed therein and an inorganic gas barrier layer is preferably 1.00E-4/° C. or lower, more preferably 8.00E-5/° C. or lower, as measured in the temperature range of 100° C. to 160° C.

If the coefficient of linear expansion of the resin sheet containing dispersed particles exceeds 1.00E-4/° C., not only positioning errors in patterning are apt to occur when a color filter is formed thereon, but also it is difficult to form an electrode on the resin sheet.

In the resin sheet containing dispersed particles of the invention which comprises a base layer comprising a resin and an inorganic oxide dispersed therein and an inorganic gas barrier layer, the dimensional change thereof as calculated from the size thereof measured immediately after 20 minutes heating at 150° C. and the size thereof measured immediately after 20 minutes heating at 150° C. and subsequent 2 hours standing at room temperature is preferably lower than +0.015%, more preferably +0.012% or lower. The dimensional change of the resin sheet can be calculated as $(B-A)/A\times100$, wherein A is the size of the resin sheet measured immediately after 20 minutes heating at 150° C. and B is the size of the resin sheet measured after 20 minutes heating at 150° C. and subsequent 2 hours standing at room temperature. If the dimensional change of the resin sheet containing dispersed particles is +0.015% or higher, not only positioning errors in patterning are apt to occur when a color filter is formed thereon, but also it is difficult to form an electrode on the resin sheet.

The resin sheet containing dispersed particles of the invention which comprises a base layer comprising a resin and an inorganic oxide dispersed therein and an inorganic gas barrier layer preferably has a water vapor permeability of 10 g/m$^2$·24 h·atm or lower. If the water vapor permeability thereof is higher than 10 g/m$^2$·24 h·atm, use of this resin sheet containing dispersed particles in forming a liquid crystal cell may pose problems, for example, that water vapor and oxygen penetrate into the cell to break the transparent conductive film pattern and that the water vapor and oxygen which have entered the cell accumulate to form bubbles and thereby arouse troubles such as appearance failures and alteration of the liquid crystal.

The resin sheet containing dispersed particles of the invention which comprises a base layer comprising a resin and an inorganic oxide dispersed therein and an inorganic gas barrier layer preferably has a yellowness index change, as calculated from the yellowness index thereof determined after 30 minutes heating at 200° C. and the yellowness index thereof determined at room temperature, of 0.75 or lower. If the yellowness index change of the reflection type resin sheet exceeds 0.75, use of this resin sheet in fabricating a liquid crystal display may result in cases where display quality is impaired, for example, because a white picture assumes a yellowish tint.

Figure 6:
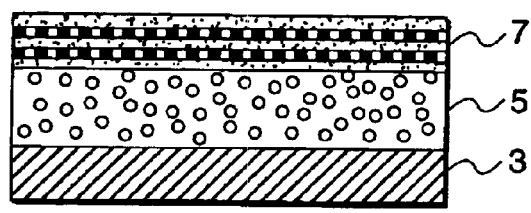
FIG. 6 is a sectional view of still a further resin sheet containing dispersed particles.

In the resin sheet containing dispersed particles of the invention which comprises a base layer comprising a resin and an inorganic oxide dispersed therein and an inorganic gas barrier layer, the base layer may contain a diffuser dispersed therein which has a refractive index different from that of the resin constituting the base layer and an average particle diameter of 0.2 to 100 μm, in an amount of 0.1 to 60% by weight based on the weight of the base layer. Namely, the base layer in the invention may contain, dispersed therein, both an inorganic oxide and a diffuser. The amounts of the inorganic oxide and the diffuser incorporated are preferably 0.1 to 23% by weight and 0.1 to 60% by weight, respectively, based on the weight of the base layer. An example of a resin sheet containing dispersed particles which comprises the resin sheet containing dispersed particles described above and a urethane-acrylate layer superposed thereon is shown in FIG. 6. The term "base layer containing a diffuser dispersed therein" means that the diffuser is present throughout the whole base layer without being present in a higher concentration in part of the base layer The inorganic oxide serves to inhibit the base layer from dimensionally changing, while the diffuser imparts a light diffusion function to the base layer. By the impartation of a light diffusion function, the resin sheet containing dispersed particles, when used in a liquid crystal display, can prevent the glitter attributable to illumination or the built-in backlight to thereby improve visibility.

Examples of the diffuser include conductive inorganic particles made of a silicon compound, alumina, titania, zirconia, tin oxide, indium oxide, cadmium oxide, antimony oxide, or the like, organic particles made of an acrylic resin, melamine resin, or the like, and particles formed by coating the inorganic particles with the organic particles.

The diffuser has an average particle diameter of generally 0.2 to 100 μm, preferably 0.5 to 50 μm, more preferably 1 to 20 μm, from the standpoint of obtaining sufficient light diffusion properties, although such particle diameters may result in a decrease in an optical property.

The difference in specific gravity between the diffuser and the resin constituting the base layer is preferably 1 or smaller. If the difference in specific gravity therebetween is larger than 1, it is difficult to form a base layer in which the diffuser has been evenly incorporated.

The difference in refractive index between the diffuser and the resin constituting the base layer is preferably 0.03 to 0.10 If the difference in refractive index therebetween is smaller than 0.03 or larger than 0.10, a sufficient light diffusion function cannot be imparted.

In the resin sheet containing dispersed particles described above in which the base layer contains both an inorganic oxide and a diffuser and is an outermost layer, the outer surface of the base layer is preferably smooth. The term "smooth" herein means that the surface roughness (Ra) of the layer determined in accordance with JIS B 0601-1994 is 1 nm or lower. Such a smooth surface of the base layer facilitates formation of an alignment film, transparent electrode, and other layers thereon.

A liquid crystal display is generally fabricate, for example, by suitably assembling components including a polarizing film, a liquid crystal cell, a reflector or backlight, and optional optical parts and integrating an operating circuit into the assembly. In the invention, a liquid crystal display can be fabricated according to such a conventional procedure without particular limitations, except that the resin sheet containing dispersed particles described above is used in which the base layer contains both an inorganic oxide and a diffuser and which has an inorganic gas barrier layer. Consequently, appropriate optical parts can be suitably used in combination with the resin sheet containing dispersed particles in fabricating the liquid crystal display of the invention. For example, a light diffuser plate, antiglare layer, antireflection film, protective layer, or protective plate may be disposed over a viewing-side polarizing film. Furthermore, a retardation film for compensation may be interposed between the liquid crystal cell and the viewing-side polarizing film.

Figure 7:
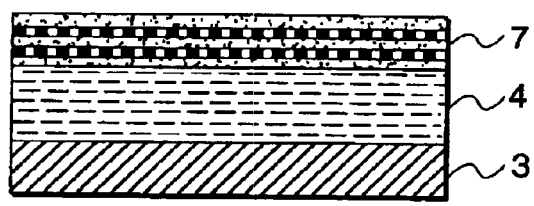
FIG. 7 is a sectional view of still a further resin sheet containing dispersed particles.

The invention can furthermore provides a resin sheet containing dispersed particles which comprises: a base layer which is constituted of a thermoplastic resin or thermoset resin and contains, dispersed in the resin, a diffuser which has a refractive index different from that of the resin and has an average particle diameter of 0.2 to 100 μm; and an inorganic gas barrier layer, wherein the amount of the diffuser is 200 parts by weight or smaller per 100 parts by weight of the resin constituting the base layer. Namely, in the invention, the base layer may contain, as the only particulate ingredient, a diffuser having a refractive index different from that of the resin constituting the base layer. An example of a resin sheet containing dispersed particles which comprises the resin sheet containing dispersed particles described above and a urethane-acrylate layer superposed thereon is shown in FIG. 7.

The amount of the diffuser to be used can be suitably determined according to the desired degree of light diffusion, etc. However, the amount of the diffuser to be incorporated is generally 200 parts by weight or smaller, preferably 1 to 150 parts by weight, more preferably 2 to 100 parts by weight, per 100 parts by weight of the resin constituting the base layer, when the diffuser is transparent particles.

The diffuser has an average particle diameter of generally 0.2 to 100 μm, preferably 0.5 to 50 μm, more preferably 1 to 20 μm, from the standpoint of obtaining sufficient light diffusion properties, although such particle diameters may result in a decrease in an optical property.

The difference in specific gravity between the diffuser and the resin constituting the base layer is preferably 1 or smaller. If the difference in specific gravity therebetween is larger than 1, it is difficult to form a base layer in which the diffuser has been evenly incorporated.

The difference in refractive index between the diffuser and the resin constituting the base layer is preferably 0.03 to 0.10. If the difference in refractive index therebetween is smaller than 0.03 or larger than 0.10, a sufficient light-diffusing function cannot be imparted.

The resin sheet containing dispersed particles described above which comprises a base layer comprising a resin and dispersed therein a diffuser having a different refractive index and an inorganic gas barrier layer preferably has a water vapor permeability of 10 g/m$^2$·24 h·atm or lower. If the water vapor permeability thereof is higher than 10 g/m$^2$·24 h·atm, use of this resin sheet containing dispersed particles in forming a liquid crystal cell may pose problems, for example, that water vapor and oxygen penetrate into the cell to break the transparent conductive film pattern and that the water vapor and oxygen which have entered the cell accumulate to form bubbles and thereby arouse troubles such as appearance failures and alteration of the liquid crystal.

Figure 8:
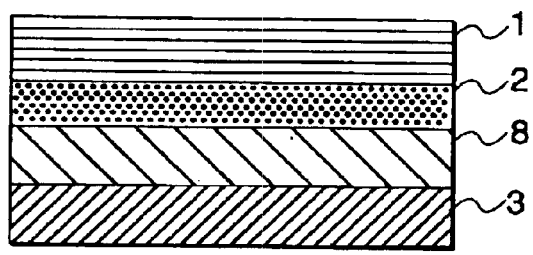
FIG. 8 is a sectional view of still a further resin sheet containing dispersed particles.

The resin sheet containing dispersed particles according to a further aspect of the invention comprises a base layer comprising a thermoplastic resin or thermoset resin and dispersed therein an inorganic oxide having an average particle diameter of 1 to 100 nm and a color filter layer, wherein the amount of the inorganic oxide is 0.1 to 23% by weight based on the weight of the base layer. An example of a resin sheet containing dispersed particles which comprises the resin sheet containing dispersed particles described above and, superposed thereon, aurethane-acrylate layer and an organic gas barrier layer is shown in FIG. 8.

In the resin sheet containing dispersed particles of the invention which comprises a base layer comprising a resin and an inorganic oxide dispersed therein and a color filter layer, examples of the inorganic oxide include silica, titanium dioxide, antimony oxide, titania, alumina, zirconia, and tungsten oxide. Such inorganic oxides may be used alone or as a mixture of two or more thereof The inorganic oxide should have a particle diameter of 1 to 100 nm. Inorganic oxides having a particle diameter smaller than 1 nm have poor dispersibility, while use of an inorganic oxide having a particle diameter exceeding 100 nm may result in a resin sheet containing dispersed particles which has impaired optical properties In the resin sheet containing dispersed particles of the invention which comprises a base layer comprising a resin and an inorganic oxide dispersed therein and a color filter layer, the amount of the inorganic oxide incorporated should be 0.1 to 23% by weight, preferably 2 to 20% by weight, more preferably 5 to 15% by weight, based on the weight of the base layer If the amount of the inorganic oxide incorporated is smaller than 0.1% by weight based on the weight of the base layer, the resulting resin sheet containing dispersed particles shows an increased dimensional change, making it difficult to pattern the color filter layer or to form an electrode thereon. If the amount thereof exceeds 23%, the resulting resin sheet containing dispersed particles has an impaired light transmittance.

Preferred methods usable for forming a color filter layer in the invention include the dyeing process, pigment dispersion process, electrodeposition method, printing method, ink jet method, and the like. However, the ink jet method is especially preferred from the standpoint of production efficiency. The ink jet method is a technique in which an ink jet apparatus is used to eject red, blue, and green inks from ink jet nozzles to thereby form given patterns. This ink jet method is effective in improving the production efficiency because red, blue, and green inks can be simultaneously applied in patterning. In addition, when an ink jet apparatus is installed in a production line for producing a resin sheet by flow casting, it becomes possible to produce a color filter-bearing resin sheet through a series of production steps including film formation by flow casting.

In the case where the ink jet method is used for patterning, inks containing a colorant and a binder resin can be used. Preferred for use as the colorant are pigments and dyes which are excellent in heat resistance, light resistance, etc. Preferred for use as the binder resin are transparent resins having excellent heat resistance. Examples thereof include melamine resins and acrylic resins. However, the binder resin should not be construed as being limited to these examples.

The coefficient of linear expansion of the resin sheet containing dispersed particles of the invention which comprises a base layer comprising a resin and an inorganic oxide dispersed therein and a color filter layer is preferably 1.00E-4/° C. or lower, more preferably 8.00E-5/° C. or lower, as measured in the temperature range of 100° C. to 160° C.

If the coefficient of linear expansion of the resin sheet containing dispersed particles exceeds 1.00E-4/° C., it is difficult to form an electrode on the resin sheet.

In the resin sheet containing dispersed particles of the invention which comprises a base layer comprising a resin and an inorganic oxide dispersed therein and a color filter layer, the dimensional change thereof as calculated from the size thereof measured immediately after 20-minute heating at 150° C. and the size thereof measured immediately after 20-minute heating at 150° C. and subsequent 2-hour standing at room temperature is preferably lower than +0.020%, more preferably +0.010% or lower. The dimensional change of the resin sheet can be calculated as $(B-A)/A \times 100$, wherein A is the size of the resin sheet measured immediately after 20 minutes heating at 150° C. and B is the size of the resin sheet measured after 20 minutes heating at 150° C. and subsequent 2 hours standing at room temperature. If the dimensional change of the resin sheet containing dispersed particles is +0.020% or higher, not only positioning errors in patterning are apt to occur in color filter formation, but also it is difficult to form an electrode on the resin sheet.

Figure 9:
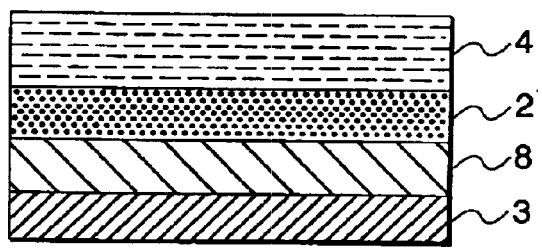
FIG. 9 is a sectional view of still a further resin sheet containing dispersed particles.

In the resin sheet containing dispersed particles of the invention which comprises a base layer comprising a resin and an inorganic oxide dispersed therein and a color filter layer, the base layer may contain a diffuser dispersed therein which has a refractive index different from that of the resin constituting the base layer and an average particle diameter of 0.2 to 100 $\mu$m, in an amount of 0.1 to 60% by weight based on the weight of the base layer. Namely, the base layer in the invention may contain, dispersed therein, both an inorganic oxide and a diffuser. The amounts of the inorganic oxide and the diffuser incorporated are preferably 0.1 to 23% by weight and 0.1 to 60% by weight, respectively, based on the weight of the base layer. An example of a resin sheet containing dispersed particles which comprises the resin sheet containing dispersed particles described above and, superposed thereon, a urethane-acrylate layer and an organic gas barrier layer is shown in FIG. 9. The term "base layer containing a diffuser dispersed therein" means that the diffuser is present throughout the whole base layer without being present in a higher concentration in part of the base layer. The inorganic oxide serves to inhibit the base layer from dimensionally changing, while the diffuser imparts a light diffusion function to the base layer. By the impartation of a light diffusion function, the resin sheet containing dispersed particles, when used in a liquid crystal display, can prevent the glitter attributable to illumination or the built-in backlight to thereby improve visibility.

Examples of the diffuser include conductive inorganic particles made of a silicon compound, alumina, titania, zirconia, tin oxide, indium oxide, cadmium oxide, antimony oxide, or the like, organic particles made of an acrylic resin, melamine resin, or the like, and particles formed by coating the inorganic particles with the organic particles.

The diffuser has an average particle diameter of generally 0.2 to 100 $\mu$m, preferably 0.5 to 50 $\mu$m, more preferably 1 to 20 $\mu$m, from the standpoint of obtaining sufficient light diffusion properties, although such particle diameters may result in a decrease in an optical property.

The difference in specific gravity between the diffuser and the resin constituting the base layer is preferably 1 or smaller. If the difference in specific gravity therebetween is larger than 1, it is difficult to form a base layer in which the diffuser has been evenly incorporated.

The difference in refractive index between the diffuser and the resin constituting the base layer is preferably 0.03 to 0.10. If the difference in refractive index therebetween is smaller than 0.03 or larger than 0.10, a sufficient light-diffusing function cannot be imparted.

In the resin sheet containing dispersed particles described above in which the base layer contains both an inorganic oxide and a diffuser and is an outermost layer, the outer surface of the base layer is preferably smooth. The term "smooth" herein means that the surface roughness (Ra) of the layer determined in accordance with JIS B 0601-1994 is 1 nm or lower. Such a smooth surface of the base layer facilitates formation of an alignment film, transparent electrode, and other layers thereon.

A liquid crystal display is generally fabricate, for example, by suitably assembling components including a polarizing film, a liquid crystal cell, a reflector or backlight, and optional optical parts and integrating an operating circuit into the assembly. In the invention, a liquid crystal display can be fabricated according to such a conventional procedure without particular limitations, except that the resin sheet containing dispersed particles described above is used in which the base layer contains both an inorganic oxide and a diffuser and which has a color filter layer. Consequently, appropriate optical parts can be suitably used in combination with the resin sheet containing dispersed particles in fabricating the liquid crystal display of the invention. For example, a light diffuser plate, antiglare layer, antireflection film, protective layer, or protective plate may be disposed over a viewing-side polarizing film. Furthermore, a retardation film for compensation may be interposed between the liquid crystal cell and the viewing-side polarizing film.

Figure 10:
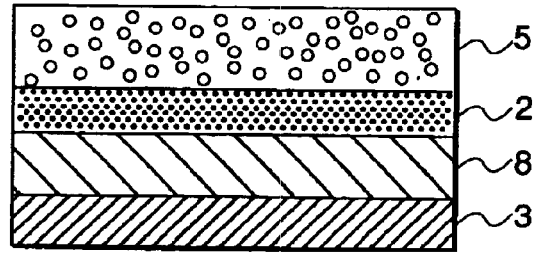
FIG. 10 is a sectional view of still a further resin sheet containing dispersed particles.

The invention can furthermore provides a resin sheet containing dispersed particles which comprises: a base layer which is constituted of a thermoplastic resin or thermoset resin and contains, dispersed in the resin, a diffuser which has a refractive index different from that of the resin and has an average particle diameter of 0.2 to 100 μm; and a color filter layer, wherein the amount of the diffuser is 200 parts by weight or smaller per 100 parts by weight of the resin constituting the base layer. Namely, in the invention, the base layer may contain, as the only particulate ingredient, a diffuser having a refractive index different from that of the resin constituting the base layer. An example of a resin sheet containing dispersed particles which comprises the resin sheet containing dispersed particles described above and, superposed thereon, a urethane-acrylate layer and an organic gas barrier layer is shown in FIG. 10.

The amount of the diffuser to be used can be suitably determined according to the desired degree of light diffusion, etc. However, the amount of the diffuser to be incorporated is generally 200 parts by weight or smaller, preferably 1 to 150 parts by weight, more preferably 2 to 100 parts by weight, per 100 parts by weight of the resin constituting the base layer, when the diffuser is transparent particles.

The diffuser has an average particle diameter of generally 0.2 to 100 μm, preferably 0.5 to 50 μm, more preferably 0.5 to 10 μm, from the standpoint of obtaining sufficient light diffusion properties.

The difference in specific gravity between the diffuser and the resin constituting the base layer is preferably 1 or smaller. If the difference in specific gravity therebetween is larger than 1, it is difficult to form a base layer in which the diffuser has been evenly incorporated.

The difference in refractive index between the diffuser and the resin constituting the base layer is preferably 0.03 to 0.10. If the difference in refractive index therebetween is smaller than 0.03 or larger than 0.10, a sufficient light-diffusing function cannot be imparted.

The resin sheet containing dispersed particles of the invention which has a color filter layer is preferably coated with an organic gas barrier layer made of, e.g., poly(vinyl alcohol) or with an inorganic gas barrier layer made of, e.g., silicon oxide.

The resin sheet containing dispersed particles which has an organic gas barrier layer preferably has a yellowness index change of 1.00 or lower. If the yellowness index change thereof exceeds 1.00, use of this resin sheet containing dispersed particles in forming a liquid crystal display may result in cases where display quality is impaired, for example, because a white picture assumes a yellowish tint.

When the resin sheet containing dispersed particles of the invention which has a color filter layer and in which the base layer contains a diffuser having a refractive index different from that of the resin constituting the base layer is used in fabricating a liquid crystal cell, it is preferred to dispose the resin sheet so that the base layer is located on the outer side of the color filter layer. Namely, it is preferred that these layers be located in the order of color filter layer/base layer from the liquid crystal layer. By disposing the color filter layer in a position closer to the liquid crystal layer, clearer images can be obtained.

The most preferred among the resin sheets containing dispersed particles of the invention is one in which the base layer contains both an inorganic oxide and a diffuser having a refractive index different from that of the resin constituting the base layer. Due to the presence of both an inorganic oxide and a diffuser in the base layer, the resin sheet containing dispersed particles can be inhibited from dimensionally changing and can have a light diffusion function to thereby attain improved display quality.

The resin sheets containing dispersed particles of the invention can be produced, for example, by the casting method or flow casting method. Specifically, the flow casting method comprises applying a urethane-acrylate solution to an endless belt, curing the coating, subsequently successively forming a gas barrier layer, a base layer, etc. thereon, and then peeling the resultant multilayer structure from the endless belt to thereby produce a resin sheet containing dispersed particles. Since the urethane-acrylate has satisfactory strippability from the endless belt, it enables the multilayer structure to be peeled from the endless belt with a slight stress while preventing the multilayer structure from damaging upon peeling.

The invention will be explained below in more detail by reference to Examples, but the invention should not be construed as being limited to these Examples in any way.

EXAMPLE 1

A hundred parts by weight of the liquid epoxy resin represented by formula (1) was mixed with 90 parts by weight of a solid epoxy resin represented by formula (2). This mixture was stirred with heating at 90° C. to completely dissolve the solid resin and then allowed to cool to room temperature to obtain an epoxy resin liquid. Subsequently, 100 parts by weight of methylhexahydrophthalic anhydride, represented by formula (3), was mixed with 12 parts by weight of the modifier represented by formula (4). This mixture was stirred with heating at 120° C. to conduct esterification, subsequently cooled to 80° C., and then allowed to cool to room temperature. This mixture was mixed with 2 parts by weight of tetra-n-butylphosphonium o,o-diethyl phosphorodithioate, represented by formula (5), to obtain a hardener. With 460 parts by weight of this hardener were mixed 8.4 parts by weight of silica particles having an average particle diameter of 12 nm (AEROSIL R974, manufactured by Nippon Aerosil Co., Ltd.) and 380 parts by weight of the epoxy resin liquid obtained above. Thus, an epoxy resin-containing liquid was prepared.

(1)
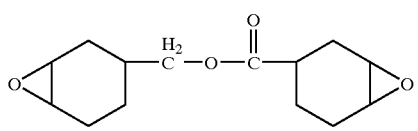

(2)
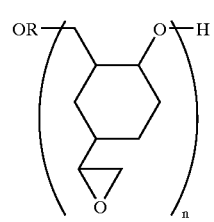

(3)
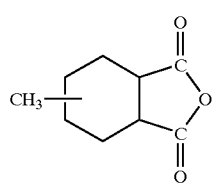

(4)
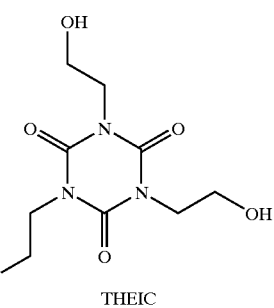

THEIC (5)
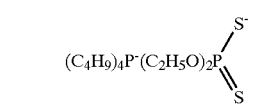

First, a 17% by weight toluene solution of the urethane-acrylate represented by formula (6) was flow-cast on a stainless-steel endless belt running at a speed of 0.3 m/min. The coating was air-dried to volatilize the toluene and then cured with a UV curing apparatus to form a urethane-acrylate layer having a thickness of 2.0 μm. Subsequently, a 5.5% by weight aqueous solution of a poly (vinyl alcohol) resin was flow-cast on the urethane-acrylate layer at an endless belt running speed of 0.3 m/min. The coating was dried at 100° C. for 10 minutes to form a poly (vinyl alcohol) layer having a thickness of 3.7 μm. Thereafter, the epoxy resin-containing liquid was flow-cast on the poly (vinylalcohol) layer at an endless belt running speed of 0.3 m/min. This coating was cured by heating with a heater first at 150° C. and then at 180° C. for 20 minutes to form an epoxy resin layer having a thickness of 400 μm. The resulting multilayer structure composed of the urethane-acrylate layer, poly(vinyl alcohol) layer, and epoxy resin layer was peeled from the stainless-steel endless belt to thereby obtain a resin sheet containing dispersed particles.

(6)
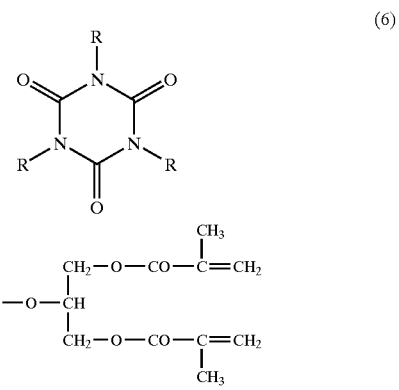

EXAMPLE 2

A resin sheet containing dispersed particles was obtained in the same manner as in Example 1, except that the amount of the silica particles to be added was changed to 16.8 parts by weight.

EXAMPLE 3

A resin sheet containing dispersed particles was obtained in the same manner as in Example 1, except that the amount of the silica particles to be added was changed to 25.2 parts by weight.

EXAMPLE 4

A resin sheet containing dispersed particles was obtained in the same manner as in Example 1, except that the amount of the silica particles to be added was changed to 84 parts by weight.

EXAMPLE 5

A resin sheet containing dispersed particles was obtained in the same manner as in Example 1, except that the amount of the silica particles to be added was changed to 168 parts by weight.

EXAMPLE 6

A resin sheet containing dispersed particles was obtained in the same manner as in Example 1, except that in preparing the epoxy resin-containing liquid, 168 parts by weight of alumina particles having an average particle diameter of 30 nm were added in place of 8.4 parts by weight of the silica particles having an average particle diameter of 12 nm.

EXAMPLE 7

The same multilayer structure as in Example 1 was formed, except that the formation of a poly(vinyl alcohol) layer was omitted. This multilayer structure, composed of a urethane-acrylate layer and an epoxy resin layer, was peeled from the stainless-steel endless belt. Subsequently, a reflecting layer made of aluminum having a thickness of 1,000 nm was formed thereon by vapor deposition on the epoxy resin layer side. Thus, a multilayer structure was obtained which was composed of, in this order, the urethane-acrylate layer as an outermost layer, the epoxy resin layer containing an inorganic oxide, and the reflecting layer.

EXAMPLE 8

An epoxy resin liquid and a hardener were prepared in the same manner as in Example 1. Subsequently, 460 parts by weight of this hardener was mixed with 84 parts by weight of silica particles having a particle diameter of 12 nm (AEROSIL R974, manufactured by Nippon Aerosil Co., Ltd.), 7.56 parts by weight of Tospearl 145 (manufactured by Toshiba Silicone Co., Ltd.; particle diameter, 3.5–4.2 μm) as a diffuser, and 380 parts by weight of the epoxy resin liquid to prepare an epoxy resin-containing liquid. Thereafter, a resin sheet containing dispersed particles was obtained by the flow casting method in the same manner as in Example 1. Namely, a multilayer structure was obtained which was composed of, in this order, a urethane-acrylate layer as an outermost layer, a poly (vinyl alcohol) layer, and an epoxy resin layer containing the inorganic oxide and the diffuser.

EXAMPLE 9

The same multilayer structure as in Example 8 was formed, except that the formation of a poly(vinyl alcohol) layer was omitted. This multilayer structure, composed of a urethane-acrylate layer and an epoxy resin layer, was peeled from the stainless-steel endless belt. Subsequently, a reflecting layer made of aluminum having a thickness of 1,000 nm was formed thereon by vapor deposition on the epoxy resin layer side. Thus, a multilayer structure was obtained which was composed of, in this order, the urethane-acrylate layer as an outermost layer, the epoxy resin layer containing an inorganic oxide and a diffuser, and the reflecting layer.

EXAMPLE 10

An epoxy resin liquid and a hardener were prepared in the same manner as in Example 1. Subsequently, 460 parts by weight of this hardener was mixed with 7.56 parts by weight of Tospearl 145 (manufactured by Toshiba Silicone Co., Ltd.) as a diffuser and 380 parts by weight of the epoxy resin liquid to prepare an epoxy resin-containing liquid. Thereafter, a resin sheet containing dispersed particles was obtained by the flow casting method in the same manner as in Example 1. Namely, a multilayer structure was obtained which was composed of, in this order, a urethane-acrylate layer as an outermost layer, a poly(vinyl alcohol) layer, and an epoxy resin layer containing the diffuser.

EXAMPLE 11

A resin sheet containing dispersed particles was obtained in the same manner as in Example 10, except that in preparing the epoxy resin-containing liquid, 7.56 parts by weight of Eposta M30 (manufactured by Nippon Shokubai Co., Ltd.) consisting of acrylic particles was added in place of 7.56 parts by weight of Tospearl 145 (manufactured by Toshiba Silicone Co., Ltd.). Namely, a multilayer structure was obtained which was composed of, in this order, a urethane-acrylate layer as an outermost layer, a poly(vinyl alcohol) layer, and an epoxy resin layer containing the diffuser.

EXAMPLE 12

An epoxy resin-containing liquid was prepared in the same manner as in Example 1. A 17% by weight toluene solution of the urethane-acrylate represented by formula (6) was flow-cast on a stainless-steel endless belt running at a speed of 0.3 m/min. The coating was air-dried to volatilize the toluene and then cured with a UV curing apparatus to form a urethane-acrylate layer having a thickness of 2.0 μm. Subsequently, the epoxy resin-containing liquid was flow-cast on the urethane-acrylate layer at an endless-belt running speed of 0.3 m/min. This coating was cured by heating with a heater first at 150° C. and then at 180° C. for 20 minutes to form an epoxy resin layer having a thickness of 400 μm. The resulting multilayer structure composed of the urethane-acrylate layer and the epoxy resin layer was peeled from the stainless-steel endless belt, and then allowed to stand on a glass plate at 180° C. for 1 hour in an atmosphere in which the oxygen concentration had been lowered to 0.5% by replacement with nitrogen. Subsequently, the multilayer structure composed of the urethane-acrylate layer and the epoxy resin layer was placed in batch sputtering apparatus SMH-2306RE, manufactured by ULVAC Corp., and 30 cc of argon gas was introduced therein to. On the epoxy resin layer side of the multilayer structure was deposited $SiO_x$ (x=1.9) by conducting sputtering for 6 minutes and 20 seconds at a frequency of 500 Hz and a pressure of 0.4 Pa. Thus, an inorganic gas barrier layer having a thickness of 100 nm was formed.

EXAMPLE 13

A resin sheet containing dispersed particles was obtained in the same manner as in Example 10, except that the amount of the silica particles to be added was changed to 16.8 parts by weight.

EXAMPLE 14

A resin sheet containing dispersed particles was obtained in the same manner as in Example 10, except that the amount of the silica particles to be added was changed to 25.2 parts by weight.

EXAMPLE 15

A resin sheet containing dispersed particles was obtained in the same manner as in Example 10, except that the amount of the silica particles to be added was changed to 84 parts by weight.

EXAMPLE 16

A resin sheet containing dispersed particles was obtained in the same manner as in Example 10, except that the amount of the silica particles to be added was changed to 168 parts by weight.

EXAMPLE 17

An epoxy resin-containing liquid was prepared in the same manner as in Example 8. Subsequently, a resin sheet containing dispersed particles was obtained in the same manner as in Example 10. Namely, a multilayer structure was obtained which was composed of, in this order, a urethane-acrylate layer as an outermost layer, an epoxy resin layer containing an inorganic oxide and a diffuser, and an inorganic gas barrier layer.

EXAMPLE 18

An epoxy resin-containing liquid was prepared in the same manner as in Example 10. Subsequently, a resin sheet containing dispersed particles was obtained in the same manner as in Example 12. Namely, a multilayer structure was obtained which was composed of, in this order, a urethane-acrylate layer as an outermost layer, an epoxy resin layer containing a diffuser, and an inorganic gas barrier layer.

EXAMPLE 19

An epoxy resin-containing liquid was prepared in the same manner as in Example 1. Subsequently, a glass plate which had a surface roughness (Ra) of 0.2 nm and in which the ratio of the distance A0 between two points as measured under the conditions of 25° C. and 20% RH to the distance A1 between the two points as measured under the conditions of 25° C. and 80% RH, i.e., the ratio A1/A0, was 1.00000 was coated with a 17% by weight toluene solution of a urethane-acrylate by means of a wire-wound bar coater. The coating was dried and then cured by UV irradiation to form a urethane-acrylate layer having a thickness of 2 μm. Colored resists respectively containing red, green, blue, and black (for matrix) pigments dispersed therein were applied to the urethane-acrylate layer to obtain a color filter layer by the pigment dispersion process. Examination of the color filter layer with a microscope revealed that the four colors of red, green, blue, and black had been accurately patterned without overlapping each other. An aqueous poly(vinyl alcohol) solution having a solid content of 5.5% was applied to the color filter layer by extrusion coating and then dried at 100° C. for 10 minutes to form a gas barrier layer having a thickness of 2 μm. The epoxy resin-containing liquid was applied to the gas barrier layer by extrusion coating and then dried at 150° C. for 30 minutes to form a base layer having a thickness of 400 μm. The resultant multilayer structure was peeled from the glass plate to obtain a resin sheet containing dispersed particles.

EXAMPLE 20

An epoxy resin-containing liquid was prepared in the same manner as in Example 1 Subsequently, a glass plate which had a surface roughness (Ra) of 0.2 nm and in which the ratio of the distance A0 between two points as measured under the conditions of 25° C. and 20% RH to the distance A1 between the two points as measured under the conditions of 25° C. and 80% RH, i.e., the ratio A1/A0, was 1.00000 was coated with a 17% by weight toluene solution of a urethane-acrylate by means of a wire-wound bar coater. The coating was dried and then cured by UV irradiation to form a urethane-acrylate layer having a thickness of 2 μm. An aqueous poly(vinyl alcohol) solution having a solid content of 5.5% was applied to the urethane-acrylate layer by extrusion coating and then dried at 100° C. for 10 minutes to form a gas barrier layer having a thickness of 2 μm. The epoxy resin-containing liquid was applied to the gas barrier layer by extrusion coating and then dried at 150° C. for 30 minutes to form a base layer having a thickness of 400 μm. Subsequently, colored resists respectively containing red, green, blue, and black (for matrix) pigments dispersed therein were applied to the epoxy resin layer to obtain a color filter layer by the pigment dispersion process. Thus, a resin sheet containing dispersed particles was obtained. Examination of the color filter layer with a microscope revealed that the four colors of red, green, blue, and black had been accurately patterned without overlapping each other.

EXAMPLE 21

A resin sheet containing dispersed particles was obtained in the same manner as in Example 17, except that the amount of the silica particles to be added was changed to 16.8 parts by weight.

EXAMPLE 22

A resin sheet containing dispersed particles was obtained in the same manner as in Example 20, except that the amount of the silica particles to be added was changed to 25.2 parts by weight.

EXAMPLE 23

A resin sheet containing dispersed particles was obtained in the same manner as in Example 20, except that the amount of the silica particles to be added was changed to 84 parts by weight.

EXAMPLE 24

A resin sheet containing dispersed particles was obtained in the same manner as in Example 20, except that the amount of the silica particles to be added was changed to 168 parts by weight.

EXAMPLE 25

An epoxy resin-containing liquid was prepared in the same manner as in Example 8. Subsequently, a resin sheet containing dispersed particles was obtained in the same manner as in Example 17. Namely, a resin sheet containing dispersed particles was obtained which was composed of, in this order, a urethane-acrylate layer as the outermost layer, a color filter layer, an organic gas barrier layer, and an epoxy resin layer containing an inorganic oxide and a diffuser.

EXAMPLE 26

An epoxy resin-containing liquid was prepared in the same manner as in Example 10. Subsequently, a resin sheet containing dispersed particles was obtained in the same manner as in Example 17. Namely, a resin sheet containing dispersed particles was obtained which was composed of, in this order, a urethane-acrylate layer as an outermost layer, a color filter layer, an organic gas barrier layer, and an epoxy resin layer containing an inorganic oxide and a diffuser.

COMPARATIVE EXAMPLE 1

A resin sheet was obtained in the same manner as in Example 1, except that the addition of silica particles was omitted. Namely, a resin sheet was obtained which was composed of, in this order, a urethane-acrylate layer as an outermost layer, a poly(vinyl alcohol) layer, and an epoxy resin layer containing no particles.

COMPARATIVE EXAMPLE 2

A resin sheet was obtained in the same manner as in Example 12, except that the addition of silica particles was omitted. Namely, a resin sheet was obtained which was composed of, in this order, a urethane-acrylate layer as an outermost layer, an epoxy resin layer containing no particles, and an inorganic gas barrier layer.

COMPARATIVE EXAMPLE 3

An epoxy resin-containing liquid was prepared in the same manner as in Example 1, except that the addition of silica particles was omitted. A glass plate was coated with a 17% by weight toluene solution of a urethane-acrylate by means of a wire-wound bar coater. The coating was dried and then cured by UV irradiation to form a urethane-acrylate layer having a thickness of 2 μm. An aqueous poly(vinyl alcohol) solution having a solid content of 5.5% was applied to the urethane-acrylate layer by extrusion coating and then dried at 100° C. for 10 minutes to form a gas barrier layer having a thickness of 2 μm. The epoxy resin-containing liquid was applied to the gas barrier layer by extrusion coating and then dried at 150° C. for 30 minutes to form a base layer having a thickness of 400 μm. The resulting multilayer structure was peeled from the glass plate.

Subsequently, colored resists respectively containing red, green, blue, and black (for matrix) pigments dispersed therein were applied so as to form a stripe pattern by the pigment dispersion process to the multilayered structure composed of the urethane-acrylate layer, gas barrier layer, and epoxy resin layer, in an attempt to form a color filter layer. However, positioning was impossible because of the too large dimensional change of the multilayer structure.

EVALUATION TEST

Light transmittance (%), coefficient of linear expansion (/° C.), dimensional change (%), oxygen permeability (cc/m$^2$·24 h·atm), yellowness index (YI), water vapor permeability (g/m$^2$·24 h·atm), and display quality:

Light transmittance was determined with a high speed spectrophotometer (CMS-500, manufactured by Murakami Shikisai; using a halogen lamp) at λ=550 nm.

Coefficient of linear expansion (/° C.) was determined by measuring TMA values (μm) at 100° C. and 160° C. with TMA/SS150C (manufactured by Seiko Instruments Inc.) and calculating the coefficient therefrom.

Dimensional change was determined by measuring the size of a sample immediately after 20 minutes heating at 150° C. and the size thereof after 20 minutes heating at 150° C. and subsequent 2 hours standing at room temperature with STM5 Olympus Digital Portable Measuring Microscope (manufactured by Olympus Co., Ltd.) and calculating the dimensional change therefrom.

Oxygen permeability was determined through a measurement with OX-TRAN TWIN, manufactured by Modern Controls Inc., by the oxitran method under the conditions of 40° C. and 43% RH.

Yellowness index (YI) was determined with CMS-500, manufactured by Murakami Shikisai, in accordance with JIS K-7103 using a platy sample having dimensions of 30×50 mm.

Water vapor permeability was determined with a cup for water vapor permeability measurement and accessories thereof in accordance with JIS Z-0208.

Furthermore, the resin sheets containing dispersed particles produced in Examples 1 to 26 and Comparative Examples 1 and 2 were used as liquid crystal cell substrates to fabricate liquid crystal displays. In a dark room, the liquid crystal displays were illuminated with a ring-shaped illuminator at an angle of 20°. Under these conditions, each liquid crystal display was examined for the display quality of a black picture while applying a voltage thereto, and was further examined for the display quality of a white picture while applying no voltage thereto. The liquid crystal displays were ranked in display quality based on the following criteria.

A: The pictures were inhibited from assuming a yellowish tint and the white picture was inhibited from glittering.

B: The pictures were inhibited from assuming a yellowish tint but the white picture glittered in a degree such that the display was practically usable.

C: The white picture was inhibited from glittering but assumed a yellowish tint in a degree such that the display was practically usable.

D: The pictures assumed a yellowish tint in a degree such that the display was practically usable, and the white picture glittered in such a degree that the display was practically usable.

The results of the evaluations are shown in Tables 1 to 4.

TABLE 1

| | Amount of silica particles based on base layer (%) | Light transmittance (%) | Coefficient of linear expansion (/° C.) | Dimensional change (%) | Yellowness index change | Oxygen permeability*1 | Water vapor permeability*2 | Display quality | Comprehensive evaluation |
|---|---|---|---|---|---|---|---|---|---|
| Example 1 | 0.99 | 92.5 | 9.66E−05 | 0.018 | 0.91 | 0.14 | 24.0 | D | ◯ |
| Example 2 | 1.96 | 91.8 | 8.92E−05 | 0.012 | 0.91 | 0.14 | 24.0 | D | ◯ |
| Example 3 | 2.91 | 91.2 | 8.65E−05 | 0.011 | 0.91 | 0.14 | 24.0 | D | ◯ |
| Example 4 | 9.09 | 90.3 | 7.83E−05 | 0.005 | 0.91 | 0.14 | 24.0 | D | ◯ |
| Example 5 | 16.67 | 88.9 | 6.12E−05 | 0.004 | 0.91 | 0.14 | 24.0 | D | ◯ |
| Example 6 | 16.67 | 88.3 | 6.22E−05 | 0.004 | 0.91 | 0.14 | 24.0 | D | ◯ |
| Comparative Example 1 | 0 | 92.8 | 1.06E−04 | 0.020 | 0.91 | 0.14 | 24.0 | D | X |

*1Oxygen permeability (cc/m$^2$ · 24 h · atm)
*2Water vapor permeability (g/m$^2$ · 24 h · atm)

TABLE 2

| | Amount of silica particles based on base layer (%) | Light transmittance (%) | Coefficient of linear expansion (/° C.) | Dimensional change (%) | Yellowness index change | Oxygen permeability*1 | Water vapor permeability*2 | Display quality | Comprehensive evaluation |
|---|---|---|---|---|---|---|---|---|---|
| Example 7 | 0.99 | — | 9.65E−05 | 0.002 | 0.58 | 0.04 | 4.8 | B | ◯ |
| Example 8 | 9.02 | 89.2 | 7.82E−05 | 0.005 | 0.91 | 0.13 | 24.0 | C | ◯ |
| Example 9 | 9.02 | — | 7.80E−05 | 0.001 | 0.58 | 0.04 | 4.8 | A | ◯ |
| Example 10 | 0 | 90.7 | 9.98E−05 | 0.020 | 0.91 | 0.13 | 24.0 | C | ◯ |

TABLE 2-continued

|  | Amount of silica particles based on base layer (%) | Light transmittance (%) | Coefficient of linear expansion (/° C.) | Dimensional change (%) | Yellowness index change | Oxygen permeability*1 | Water vapor permeability*2 | Display quality | Comprehensive evaluation |
|---|---|---|---|---|---|---|---|---|---|
| Example 11 | 0 | 90.2 | 9.94E−05 | 0.020 | 0.91 | 0.13 | 24.0 | C | ○ |
| Comparative Example 1 | 0 | 92.8 | 1.06E−04 | 0.020 | 0.91 | 0.14 | 24.0 | D | X |

*1Oxygen permeability (cc/m$^2$ · 24 h · atm)
*2Water vapor permeability (g/m$^2$ · 24 h · atm)

Light transmittance was not measured in Examples 7 and 9.

TABLE 3

|  | Amount of silica particles based on base layer (%) | Light transmittance (%) | Coefficient of linear expansion (/° C.) | Dimensional change (%) | Yellowness index change | Oxygen permeability*1 | Water vapor permeability*2 | Display quality | Comprehensive evaluation |
|---|---|---|---|---|---|---|---|---|---|
| Example 12 | 0.99 | 92.4 | 9.63E−05 | 0.008 | 0.58 | 0.04 | 4.8 | B | ○ |
| Example 13 | 1.96 | 92.0 | 8.92E−05 | 0.007 | 0.58 | 0.04 | 4.8 | B | ○ |
| Example 14 | 2.91 | 91.0 | 8.63E−05 | 0.007 | 0.58 | 0.04 | 4.8 | B | ○ |
| Example 15 | 9.09 | 90.4 | 7.82E−05 | 0.004 | 0.58 | 0.04 | 4.8 | B | ○ |
| Example 16 | 16.67 | 88.8 | 6.23E−05 | 0.003 | 0.58 | 0.04 | 4.8 | B | ○ |
| Example 17 | 9.02 | 89.0 | 7.82E−05 | 0.004 | 0.58 | 0.04 | 4.8 | A | ○ |
| Example 18 | 0 | 90.0 | 9.98E−05 | 0.009 | 0.58 | 0.04 | 4.8 | A | ○ |
| Comparative Example 2 | 0 | 92.4 | 1.10E−04 | 0.010 | 0.58 | 0.04 | 4.8 | B | X |

*1Oxygen permeability (cc/m$^2$ · 24 h · atm)
*2Water vapor permeability (g/m$^2$ · 24 h · atm)

TABLE 4

|  | Amount of silica particles based on base layer (%) | Light transmittance (%) | Coefficient of linear expansion (/° C.) | Dimensional change (%) | Yellowness index change | Oxygen permeability*1 | Water vapor permeability*2 | Display quality | Comprehensive evaluation |
|---|---|---|---|---|---|---|---|---|---|
| Example 19 | 0.99 | 92.5 | 9.66E−05 | 0.018 | 0.91 | 0.14 | 24.0 | D | ○ |
| Example 20 | 0.99 | 92.5 | 9.66E−05 | 0.018 | 0.91 | 0.14 | 24.0 | D | ○ |
| Example 21 | 1.96 | 91.8 | 8.93E−05 | 0.012 | 0.91 | 0.14 | 24.0 | D | ○ |
| Example 22 | 2.91 | 91.2 | 8.63E−05 | 0.011 | 0.91 | 0.14 | 24.0 | D | ○ |
| Example 23 | 9.09 | 90.3 | 7.85E−05 | 0.005 | 0.91 | 0.14 | 24.0 | D | ○ |
| Example 24 | 16.67 | 88.9 | 6.08E−05 | 0.004 | 0.91 | 0.14 | 24.0 | D | ○ |
| Example 25 | 9.02 | 88.3 | 1.84E−05 | 0.005 | 0.91 | 0.14 | 24.0 | C | ○ |
| Example 26 | 0 | 93.0 | 9.98E−05 | 0.020 | 0.91 | 0.14 | 24.0 | C | ○ |

*1Oxygen permeability (cc/m$^2$ · 24 h · atm)
*2Water vapor permeability (g/m$^2$ · 24 h · atm)

The resin sheets obtained in Examples 1 to 5, in which silica particles were added, each had a low coefficient of linear expansion, a low dimensional change, and a high light transmittance. A color filter layer was superposed on each of the resin sheets containing dispersed particles obtained in Examples 1 to 5 and, as a result, accurate patterning could be conducted. These resin sheets were used to fabricate liquid crystal displays. As a result, the pictures assumed a yellowish tint in such a degree that the displays were practically usable, and the white picture glittered in such a degree that the displays were practically usable.

The resin sheet obtained in Example 6, in which alumina particles were added, had a low coefficient of linear expansion, a low dimensional change, and a high light transmittance. A color filter layer was superposed on the resin sheet containing dispersed particles obtained in Example 6 and, as a result, accurate patterning could be conducted. This resin sheet was used to fabricate a liquid crystal display. As a result, the pictures assumed a yellowish tint in such a degree that the display was practically usable, and the white picture glittered in such a degree that the display was practically usable.

The reflection type resin sheet obtained in Example 7 had a low coefficient of linear expansion, a low dimensional change, and a high gas barrier function. This resin sheet was used to fabricate a liquid crystal display. As a result, the pictures were inhibited from assuming a yellowish tint but the white picture glittered in such a degree that the display was practically usable.

The resin sheet obtained in Example 8 had a low coefficient of linear expansion, a low dimensional change, and a light-diffusing function. This resin sheet was used to fabricate a liquid crystal display. As a result, the white picture was inhibited from glittering but assumed a yellowish tint in such a degree that the display was practically usable.

The reflection type resin sheet obtained in Example 9 had a low coefficient of linear expansion, a low dimensional change, a high gas barrier function, and a light diffusion function. This resin sheet was used to fabricate a liquid crystal display. As a result, the pictures were inhibited from assuming a yellowish tint and the white picture was inhibited from glittering.

The resin sheet obtained in Example 10 had a high coefficient of linear expansion and a high dimensional change. It was therefore difficult to form a color filter or electrode thereon. This resin sheet was used to fabricate a liquid crystal display. As a result, the white picture was inhibited from glittering but assumed a yellowish tint in such a degree that the display was practically usable.

The resin sheet obtained in Example 11 had a high coefficient of linear expansion and a high dimensional change. It was therefore difficult to form a color filter or electrode thereon. This resin sheet was used to fabricate a liquid crystal display. As a result, the white picture was inhibited from glittering but assumed a yellowish tint in such a degree that the display was practically usable.

The resin sheets obtained in Examples 12 to 16, in which silica particles were added, each had a low coefficient of linear expansion and a low dimensional change, and the formation of a color filter or electrode thereon was easy. They further had a high light transmittance and satisfactory weatherability. These resin sheets were used to fabricate liquid crystal displays. As a result, the pictures were inhibited from assuming a yellowish tint but the white picture glittered in such a degree that the displays were practically usable.

The resin sheet obtained in Example 17 had a low coefficient of linear expansion and a low dimensional change, and the formation of a color filter or electrode thereon was easy. It further had a high light transmittance and satisfactory weather ability. This resin sheet was used to fabricate a liquid crystal display. As a result, the pictures were inhibited from assuming a yellowish tint and the white picture was inhibited from glittering.

The resin sheet obtained in Example 18 had a low dimensional change, although its coefficient of linear expansion was high. A color filter layer and an electrode could be formed thereon satisfactorily. The resin sheet further had a high light transmittance and satisfactory weatherability. This resin sheet was used to fabricate a liquid crystal display. As a result, the pictures were inhibited from assuming a yellowish tint and the white picture was inhibited from glittering The resin sheets obtained in Examples 19 to 24, in which silica particles were added, each had a low coefficient of linear expansion and a low dimensional change, and the formation of an electrode thereon was easy. These resin sheets were used to fabricate liquid crystal displays. As a result, the pictures assumed a yellowish tint in such a degree that the displays were practically usable, and the white picture glittered in such a degree that the displays were practically usable.

The resin sheet obtained in Example 25 had a low coefficient of linear expansion and a low dimensional change, and the formation of an electrode thereon was easy. This resin sheet was used to fabricate a liquid crystal display. As a result, the white picture was inhibited from glittering but assumed a yellowish tint in such a degree that the display was practically usable.

The resin sheet obtained in Example 26 had a high coefficient of linear expansion and a high dimensional change, and it was difficult to form an electrode thereon. This resin sheet was used to fabricate a liquid crystal display. As a result, the white picture was inhibited from glittering but assumed a yellowish tint in such a degree that the display was practically usable.

The resin sheet obtained in Comparative Example 1, in which no silica particles were added, had a high coefficient of linear expansion and a high dimensional change, although its light transmittance was high. It was therefore difficult to form a color filter or electrode thereon. This resin sheet was used to fabricate a liquid crystal display. As a result, the pictures assumed a yellowish tint in such a degree that the display was practically usable, and the white picture glittered in such a degree that the display was practically usable.

The resin sheet obtained in Comparative Example 2 had a high coefficient of linear expansion, although its dimensional change was low. It was difficult to form a color filter or electrode thereon. This resin sheet was used to fabricate a liquid crystal display. As a result, the pictures were inhibited from assuming a yellowish tint, but the white picture glittered in such a degree that the display was practically usable.

Since the resin sheets containing dispersed particles of the invention are based on a resin, they are thin and lightweight and have excellent mechanical strength. When the base layer contains an inorganic oxide dispersed therein, this resin sheet can be inhibited from dimensionally changing, making it easy to form an electrode or color filter thereon. Furthermore, when the base layer contains a diffuser dispersed therein, this resin sheet can have a light diffusion function. When a reflecting layer and an inorganic gas barrier layer are superposed on any of such resin sheets containing dispersed particles of the invention, the resultant resin sheet is characterized by having a satisfactory gas barrier function, a low yellowness index change, and excellent heat resistance.

What is claimed is:

1. A liquid crystal cell substrate which corn rises a base layer comprising an epoxy resin and dispersed therein an inorganic oxide having an average particle diameter of 1 to 100 nm, the amount of the inorganic oxide being 0.1 to 23% by weight based on the weight of the base layer.

2. The liquid crystal cell substrate of claim 1, which has a light transmittance of 88% or higher at $\lambda=550$ nm.

3. The liquid crystal cell substrate of claim 1, which has a coefficient of linear expansion of 1.00E-4/° C. or lower as measured in the temperature range of 100° C. to 160° C.

4. The liquid crystal cell substrate of claim 1, wherein the dimensional change of the resin sheet as calculated from the size thereof measured immediately after 20 minutes heating at 150° C. and the size thereof measured immediately after 20 minutes heating at 150° C. and subsequent 2 hours standing at room temperature is lower than +0.020%.

5. A liquid crystal cell substrate which comprises the liquid crystal cell substrate of claim 1 and an electrode formed thereon.

6. A liquid crystal cell substrate which comprises the liquid crystal cell substrate of claim 1 and formed thereon a reflecting layer comprising a thin metal layer.

7. The liquid crystal cell substrate of claim 6, which has an oxygen permeability of 0.3 $cc/m^2 \cdot 24$ h·atm or lower.

8. The liquid crystal cell substrate of claim 1, wherein the base layer further contains a diffuser dispersed therein which has a refractive index different from that of the epoxy resin and has an average particle diameter of 0.2 to 100 µm, the amount of the diffuser being 0.1 to 60% by weight based on the weight of the base layer.

9. The liquid crystal cell substrate of claim 8, wherein the difference in specific gravity between the diffuser and the epoxy resin is 1 or smaller.

10. The liquid crystal cell substrate of claim 8, wherein the difference in refractive index between the diffuser and the epoxy resin is 0.03 to 0.10.

11. A liquid crystal cell substrate which comprises the liquid crystal cell substrate of claim 8 and formed thereon a reflecting layer comprising a thin metal layer.

12. The liquid crystal cell substrate of claim 11, which has an oxygen permeability of 0.3 cc/m²·24 h·atm or lower.

13. The liquid crystal cell substrate of claim 8, wherein the base layer is an outermost layer and the outer surface of the base layer is smooth.

14. A liquid crystal cell substrate which comprises a base layer comprising an epoxy resin and dispersed therein, a diffuser which has a refractive index different from that of the epoxy resin and has an average particle diameter of 0.2 to 100 µm, the amount of the diffuser being 200 parts by weight or smaller per 100 parts by weight of the epoxy resin.

15. The liquid crystal cell substrate of claim 14, wherein the difference in specific gravity between the diffuser and the epoxy resin is 1 or smaller.

16. The liquid crystal cell substrate of claim 14, wherein the difference in refractive index between the diffuser and the epoxy resin is 0.03 to 0.10.

17. A liquid crystal cell substrate which comprises the liquid crystal cell substrate of claim 14 and formed thereon a reflecting layer comprising a thin metal layer.

18. The liquid crystal cell substrate of claim 17, which has an oxygen permeability of 0.3 cc/m²·24 h·atm or lower.

19. A liquid crystal cell substrate which comprises a base layer comprising an epoxy resin and dispersed therein an inorganic oxide having an average particle diameter of 1 to 100 nm and an inorganic gas barrier layer, the amount of the inorganic oxide being 0.1 to 23% by weight based on the weight of the base layer.

20. The liquid crystal cell substrate of claim 19, which has a light transmittance of 85% or higher at λ=550 nm.

21. The liquid crystal cell substrate of claim 19, which has a coefficient of linear expansion of 1.00E-4/° C. or lower as measured in the temperature range of 100° C. to 160° C.

22. The liquid crystal cell substrate of claim 19, wherein the dimensional change of the resin sheet as calculated from the size thereof measured immediately after 20 minutes heating at 150° C. and the size thereof measured immediately after 20 minutes heating at 150° C. and subsequent 2 hours standing at room temperature is lower than +0.015%.

23. The liquid crystal cell substrate of claim 19, wherein the inorganic gas barrier layer is made of a silicon oxide, in which the ratio of the number of oxygen atoms to that of silicon atoms is 1.5 to 2.0.

24. The liquid crystal cell substrate of claim 19, wherein the inorganic gas barrier layer is made of a silicon nitride, in which the ratio of the number of nitrogen atoms to that of silicon atoms is 1.0 to 4/3.

25. The liquid crystal cell substrate of claim 19, wherein the inorganic gas barrier layer has a thickness of 5 to 200 nm.

26. The liquid crystal cell substrate of claim 19, which has a water vapor permeability of 10 g/m²·24 h·atm or lower.

27. The liquid crystal cell substrate of claim 19, wherein the base layer further contains a diffuser dispersed therein which has a refractive index different from that of the epoxy resin and has an average particle diameter of 0.2 to 100 µm, the amount of the diffuser being 0.1 to 60% by weight based on the weight of the base layer.

28. The liquid crystal cell substrate of claim 27, wherein the difference in specific gravity between the diffuser and the epoxy resin is 1 or smaller.

29. The liquid crystal cell substrate of claim 27, wherein the difference in refractive index between the diffuser and the epoxy resin is 0.03 to 0.10.

30. The liquid crystal cell substrate of claim 27, wherein the base layer is an outermost layer and the outer surface of the base layer is smooth.

31. A liquid crystal cell substrate which comprises: a base layer comprising an epoxy resin and dispersed therein, a diffuser which has a refractive index different from that of the epoxy resin and has an average particle diameter of 0.2 to 100 µm; and an inorganic gas barrier layer, the amount of the diffuser being 200 parts by weight or smaller per 100 parts by weight of the epoxy resin.

32. The liquid crystal cell substrate of claim 31, wherein the difference in specific gravity between the diffuser and the epoxy resin is 1 or smaller.

33. The liquid crystal cell substrate of claim 31, wherein the difference in refractive index between the diffuser and the epoxy resin is 0.03 to 0.10.

34. The liquid crystal cell substrate of claim 31, which has a water vapor permeability of 10 g/m²·24 h·atm or lower.

35. A liquid crystal cell substrate which comprises a base layer comprising an epoxy resin and dispersed therein an inorganic oxide having an average particle diameter of 1 to 100 nm and a color filter layer, the amount of the inorganic oxide being 0.1 to 23% by weight based on the weight of the base layer.

36. The liquid crystal cell substrate of claim 35, which has a coefficient of linear expansion of 1.00E-4/° C. or lower as measured in the temperature range of 100° C. to 160° C.

37. The liquid crystal cell substrate of claim 35, wherein the dimensional change of the resin sheet as calculated from the size thereof measured immediately after 20 minutes heating at 150° C. and the size thereof measured immediately after 20 minutes heating at 150° C. and subsequent 2 hours standing at room temperature is lower than +0.020%.

38. The liquid crystal cell substrate of claim 35, wherein the base layer further contains a diffuser dispersed therein which has a refractive index different from that of the epoxy resin and has an average particle diameter of 0.2 to 100 µm, the amount of the diffuser being 0.1 to 60% by weight based on the weight of the base layer.

39. The liquid crystal cell substrate of claim 38, wherein the difference in specific gravity between the diffuser and the epoxy resin is 1 or smaller.

40. The liquid crystal cell substrate of claim 38, wherein the difference in refractive index between the diffuser and the epoxy resin is 0.03 to 0.10.

41. The liquid crystal cell substrate of claim 38, wherein the base layer is an outermost layer and the outer surface of the base layer is smooth.

42. A liquid crystal cell substrate which comprises: a base layer comprising an epoxy resin and dispersed, a diffuser which has a refractive index different from that of the epoxy resin and has an average particle diameter of 0.2 to 100 µm;

and a color filter layer, the amount of the diffuser being 200 parts by weight or smaller per 100 parts by weight of the epoxy resin.

43. The liquid crystal cell substrate of claim 42, wherein the difference in specific gravity between the diffuser and the epoxy resin is 1 or smaller.

44. The liquid crystal cell substrate of claim 42, wherein the difference in refractive index between the diffuser and the epoxy resin is 0.03 to 0.10.

* * * * *